(12) United States Patent
Gebrian et al.

(10) Patent No.: US 11,366,131 B2
(45) Date of Patent: Jun. 21, 2022

(54) METHOD AND APPARATUS TO AUTOMATICALLY TRANSFER AND OPEN A REAGENT CONTAINER

(71) Applicant: Siemens Healthcare Diagnostics Inc., Tarrytown, NY (US)

(72) Inventors: Peter L. Gebrian, Townsend, DE (US); Joseph E. Brennan, Newark, DE (US); Ronald G. Barlow, Wilmington, DE (US); William E. Hudson, Bear, DE (US); William H. Reigle, Jr., Rising Sun, MD (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 272 days.

(21) Appl. No.: 16/308,784

(22) PCT Filed: Jun. 22, 2017

(86) PCT No.: PCT/US2017/038855
§ 371 (c)(1),
(2) Date: Dec. 10, 2018

(87) PCT Pub. No.: WO2018/005239
PCT Pub. Date: Jan. 4, 2018

(65) Prior Publication Data
US 2019/0145996 A1    May 16, 2019

Related U.S. Application Data

(60) Provisional application No. 62/357,909, filed on Jul. 1, 2016.

(51) Int. Cl.
*G01N 35/10*    (2006.01)
*G01N 35/00*    (2006.01)
(Continued)

(52) U.S. Cl.
CPC .......... *G01N 35/1002* (2013.01); *B25J 15/08* (2013.01); *G01N 35/0099* (2013.01);
(Continued)

(58) Field of Classification Search
CPC ........... G01N 35/1002; G01N 35/0099; G01N 35/1079; G01N 35/109; G01N 35/00732;
(Continued)

(56) References Cited

U.S. PATENT DOCUMENTS 5,357,095 A    10/1994   Weyrauch et al.
6,387,106 B1 *  5/2002   Howell ............... A61B 17/122
                                                            606/151
(Continued)

FOREIGN PATENT DOCUMENTS

CN         1407341 A     4/2003
CN       104335050 A     2/2015
(Continued)

OTHER PUBLICATIONS

PCT International Search Report and Written Opinion dated Oct. 30, 2017 (12 Pages).
(Continued)

*Primary Examiner* — Jill A Warden
*Assistant Examiner* — John McGuirk

(57) ABSTRACT

Embodiments are directed to transferring and opening reagent containers for use in a clinical analyzer in an in vitro diagnostics (IVD) environment. Contents of a reagent container may be automatically recorded, and the container is positioned and opened, making available its contents to a transfer probe. A set of mechanical fingers open and close relative to one another, to release and grip the reagent container on opposite sides thereof for transferring the container. Once the container is positioned, the mechanical fingers raise and are positioned above a seal concealing the (Continued)

contents of the reagent container. The fingers are configured to close together and travel in a downward trajectory to pierce the seal. The reagent container is originally presented as an un-opened package to prevent spillage and to control reagent life expectancy. According to an embodiment, a method of performing a cycle unload, transfer, and load, without operator intervention, is provided.

17 Claims, 15 Drawing Sheets

(51) Int. Cl.
*B25J 15/08* (2006.01)
*G01N 35/04* (2006.01)
(52) U.S. Cl.
CPC ....... *G01N 35/00732* (2013.01); *G01N 35/04* (2013.01); *G01N 35/109* (2013.01); *G01N 35/1065* (2013.01); *G01N 35/1083* (2013.01); *G01N 35/1079* (2013.01); *G01N 2035/00673* (2013.01); *G01N 2035/00752* (2013.01); *G01N 2035/00811* (2013.01); *G01N 2035/0405* (2013.01); *G01N 2035/0443* (2013.01); *G01N 2035/0475* (2013.01)
(58) Field of Classification Search
CPC ............... G01N 35/04; G01N 35/1065; G01N 35/1083; G01N 2035/00673; G01N 2035/0405; G01N 2035/00811; G01N 2035/00752; G01N 2035/0443; G01N 2035/0475; B25J 15/08
See application file for complete search history.

(56) References Cited

U.S. PATENT DOCUMENTS

| | | | |
|---|---|---|---|
| 8,318,094 B1 | 11/2012 | Bayandorian et al. | |
| 8,703,492 B2 | 4/2014 | Self et al. | |
| 9,315,334 B2 | 4/2016 | Mellars et al. | |
| 2010/0132484 A1* | 6/2010 | Schacher | G01N 35/1002 73/863.01 |
| 2013/0274913 A1* | 10/2013 | Wilson | B25J 15/0038 700/214 |
| 2015/0153369 A1 | 6/2015 | Giovanoli | |
| 2015/0273468 A1* | 10/2015 | Croquette | B01L 3/50825 422/63 |
| 2020/0319222 A1* | 10/2020 | VanSickler | B25J 19/0025 |

FOREIGN PATENT DOCUMENTS

| | | | |
|---|---|---|---|
| DE | 29518548 U1 | 2/1996 | |
| EP | 0973039 A2 | 1/2000 | |
| EP | 1898220 A1 | 3/2008 | |
| JP | H03-085453 A | 4/1991 | |
| JP | H0894624 A | 4/1996 | |
| JP | 2000-052288 A | 2/2000 | |
| JP | 2004-089789 A | 3/2004 | |
| JP | 2004-511788 A | 4/2004 | |
| JP | 2007-526479 A | 9/2007 | |
| JP | 2013-224970 A | 10/2013 | |
| JP | 2015-511717 A | 4/2015 | |
| WO | WO-2015153759 A1 * | 10/2015 | ............ B25J 15/026 |

OTHER PUBLICATIONS

Extended EP Search Report dated Jun. 24, 2019 of corresponding European Application No. 17820966.4, 4 Pages.

* cited by examiner

METHOD AND APPARATUS TO AUTOMATICALLY TRANSFER AND OPEN A REAGENT CONTAINER

CROSS-REFERENCE TO RELATED APPLICATIONS

This application claims priority to U.S. provisional application Ser. No. 62/357,909 filed Jul. 1, 2016, the contents of which is incorporated herein by reference in its entirety.

TECHNOLOGY FIELD

The present invention relates generally to handling a container in an in vitro diagnostics environment, and more particularly to the safe and efficient transfer and opening of reagent containers in a clinical analyzer.

BACKGROUND

A diagnostic or clinical analyzer may include one or more reagent storage areas dedicated to storage and supply of a respective reagent, each reagent storage area including a plurality of reagent containers containing the respective reagent. Reagents may be used for the diagnosis of disease, for treatment efficacy monitoring or evaluation, and for security-related drug detection testing, among other uses. The handling of reagents thus requires significant reliability.

In transferring the reagent containers to the reagent storage areas of a clinical analyzer or other analysis instrument, the reagents need to be protected from waste, spillage, and contamination. Traditional methods of manual batching and individual loading of reagent containers, as well as manual cap removal or seal puncture to provide access to the reagents, are prone to spillage, waste through the spillage, and cross-contamination. Moreover, maintenance of reagent containers on clinical analyzers is a time-consuming process, presenting a repetitive, non-ergonomic activity for laboratory personnel and presenting numerous potential hazards and errors, especially in environments with high volume, automated facilities. An additional concern is depletion or unavailability of reagents, presenting delays to patient test results and introducing handling errors.

Thus, there is a need for protecting reagents from waste and spillage, reducing operator errors, and improving reliability of test outcomes, in the transfer and opening of reagent containers in a clinical analyzer. There is also a need to provide the reagent containers in a safe and efficient manner.

SUMMARY

Embodiments are directed to an automatic transfer and opening of a reagent container in, for example, a clinical analyzer in an in vitro diagnostics environment.

In an embodiment, a reagent transfer arm apparatus in a clinical analyzer in an in vitro diagnostics (IVD) environment comprises: a gripper assembly; a horizontally-extending transfer arm to which the gripper assembly is moveably coupled and along which the gripper assembly moves in a horizontal direction; and a transfer arm motor configured to control horizontal movement of the gripper assembly along the horizontally-extending transfer arm. The gripper assembly comprises: a pair of gripper fingers oriented vertically and opposite one another, the pair of gripper fingers configured to move between a release position in which the pair of gripper fingers are spread apart with respect to one another and a grip position in which the pair of gripper fingers are pushed together with respect to one another, wherein in the grip position, the pair of gripper fingers are configured to grasp a portion of a reagent container; a gripper actuator comprising a gripper motor coupled to and configured to control horizontal, gripping movement of the pair of gripper fingers to move the pair of gripper fingers between the release position and the grip position; a vertically-extending frame to which the pair of gripper fingers and the gripper actuator are moveably coupled and along which the pair of gripper fingers and the gripper actuator move in a vertical direction; and a vertical drive motor configured to control vertical movement of the gripper assembly along the along the vertically-extending frame. One or more controllers are configured to control operation of the gripper actuator, the gripper motor, the vertical drive motor, and the transfer arm motor to transfer the reagent container between an access point and a storage area for access to contents of the reagent container.

In an embodiment, a reagent handling system in a clinical analyzer in an in vitro diagnostics (IVD) environment comprises: a reagent load station comprising a tray comprising one or more tray spaces to hold one or more reagent containers, each of the one or more reagent containers configured to hold reagent and comprising a gripping portion. The reagent handling system further comprises a reagent transfer arm apparatus comprising a gripper assembly configured to grasp, one at a time, the gripping portion of each of the one or more reagent containers and move each of the one or more reagent containers to and from a respective one of the one or more tray spaces; a vertically-extending transfer arm to which the gripper assembly is moveably coupled and along which the gripper assembly moves in a vertical direction; and a vertical drive motor configured to control vertical movement of the gripper assembly along the vertically-extending transfer arm; a horizontally-extending transfer arm to which the gripper assembly is moveably coupled and along which the gripper assembly moves in a horizontal direction; and a transfer arm motor configured to control horizontal movement of the gripper assembly along the horizontally-extending transfer arm. The reagent handling system further comprises a reagent server module comprising a storage enclosure comprising one or more indexing rings comprising indexed spaces to hold the one or more reagent containers. One or more controllers configured to control operation of the reagent load station, the gripper assembly, the vertical drive motor, the transfer arm motor, and the one or more indexing rings to provide for transfer of the one or more reagent containers between the tray and the one or more indexing rings. The horizontally-extending transfer arm of the reagent transfer arm apparatus horizontally extends along a length of the storage enclosure; and a length of the tray is oriented perpendicular to a length of the horizontally-extending transfer arm.

According to an embodiment, a method of handling reagent containers in a clinical analyzer in an in vitro diagnostics (IVD) environment comprises: identifying, by a controller, a need for a particular reagent to be added to a reagent server module comprising one or more indexing rings comprising one or more indexed spaces; moving, by transfer arm motors configured to control horizontal and vertical movement of a gripper assembly along horizontally and vertically-extending transfer arms, the gripper assembly to a reagent load station, the reagent load station comprising a tray with one or more tray spaces to hold one or more reagent containers, each of the one or more reagent containers configured to hold reagent and comprising a gripping portion, the gripper assembly configured to grasp the gripping portion of each of the one or more reagent containers; scanning, by a barcode scanner on the gripper assembly, a barcode label on each of the one or more reagent containers in the tray until a desired barcode label is identified, the desired barcode label corresponding to the particular reagent and affixed to a desired reagent container; lifting, by the gripper assembly, the desired reagent container; moving, by the transfer arm motors, the gripper assembly with the desired reagent container to a load position of the reagent server module; positioning, by the gripper assembly via the load position, the desired reagent container in a particular indexed space of the one or more indexed spaces; and opening, by the gripper assembly, a seal of the desired reagent container. The gripper assembly and transfer arm motor functions are controlled by the controller.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Embodiments are directed to an apparatus and method for transferring and opening reagent containers for use in a clinical analyzer, or other analysis instrument, in an in vitro diagnostics (IVD) environment in a hospital or laboratory setting. As clinical analyzers typically include one or more reagent storage areas dedicated to storage and supply of a respective reagent in a plurality of reagent containers, there is a need to efficiently and safely transfer the containers to the storage areas and open the containers. According to embodiments herein, an apparatus and method provide for a desired, unopened reagent container to be transferred by mechanical means. The contents of the reagent container may be automatically recorded, and the container is positioned and opened, making available its contents to a transfer probe, according to an embodiment. A set of mechanical fingers open and close, relative to one another, to release and grip the reagent container on opposite sides thereof for transferring the container. Once the container is positioned, the mechanical fingers, according to an embodiment, raise and are positioned above a seal concealing the contents of the reagent container. The fingers are configured to close together and travel in a downward trajectory to pierce the seal. In an embodiment, the reagent container is originally presented as an un-opened package to prevent spillage and to control reagent life expectancy against evaporation, oxidation, contamination, and premature aging. According to an additional embodiment, a method of performing a cycle unload, transfer, and load, without operator intervention, is provided. Specific details relating to the embodiments are described in detail below.

Although embodiments are described with respect to the transfer of reagent containers to and from a reagent storage area in a clinical analyzer and to the opening of reagent containers, the invention is not so limited. The methods and apparatus provided herein may be extended by one of ordinary skill in the art to other types of containers, storage areas, analyzers, or systems.

Figure 1:
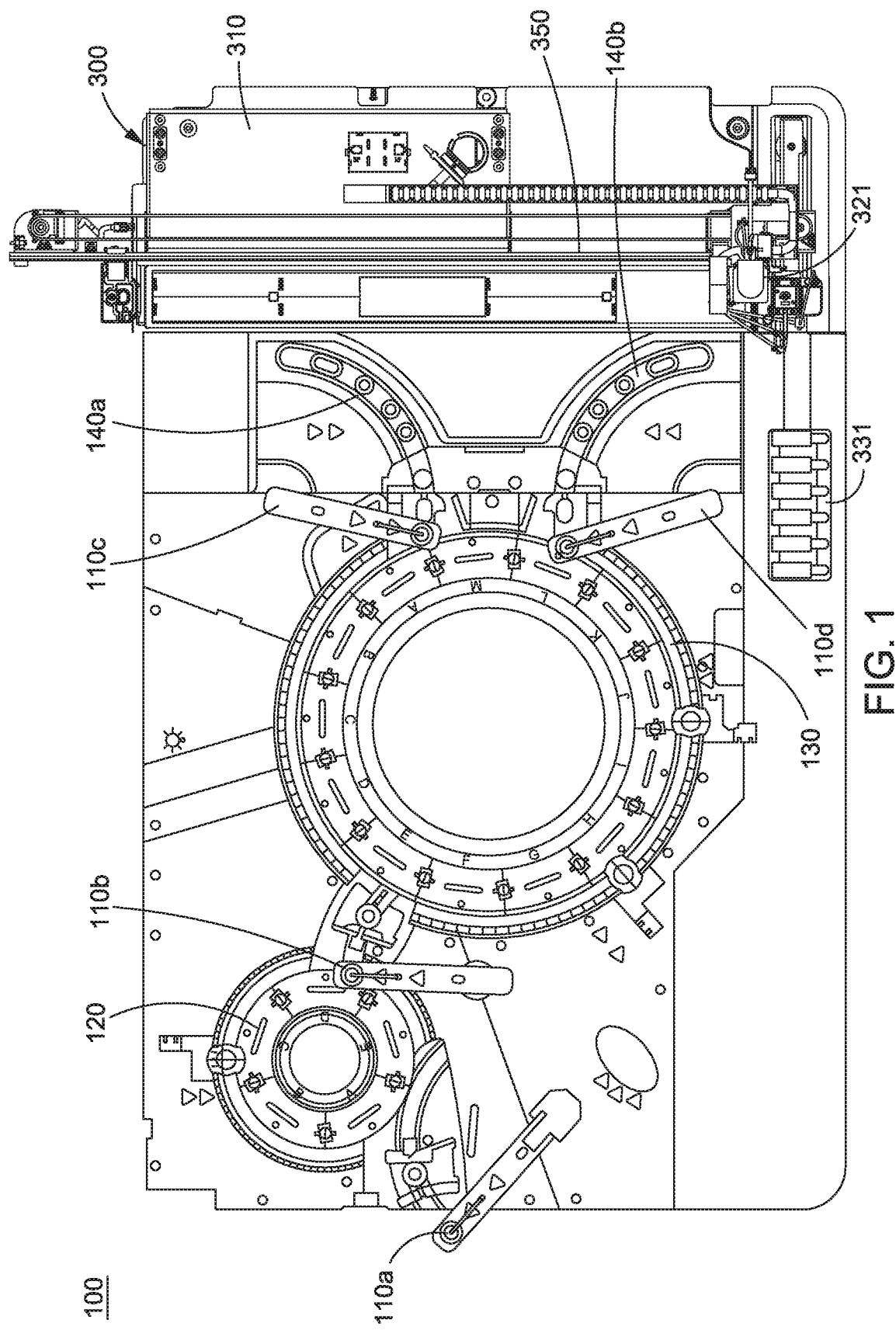
FIG. 1 is a layout of an example system architecture within which embodiments of the invention may be implemented, according to an embodiment.

FIG. 1 provides a layout of an example system architecture 100 within which embodiments of the invention may be implemented, according to an embodiment. Shown in FIG. 1 are various transfer arms 110 (110a, 110b, 110c, and 110d) with respective probes; a diluting turntable 120 including a plurality of diluting containers arranged in one or more diluting rings; a reaction turntable 130 including a plurality of reaction containers arranged in one or more reaction rings; and reagent storage areas 140a and 140b dedicated to storage and supply of a respective reagent, each reagent storage area 140a and 140b including space for a plurality of reagent containers. In operation, transfer arm 110a and its respective probe may operate to transfer sample from an access position to one or more diluting containers on the diluting turntable 120 to create a dilution therein. Transfer arm 110b and its respective probe may operate to transfer dilution from a diluting container to a reaction container on the reaction turntable 130. Transfer arms 110c and 110d and their respective probes may operate to transfer a reagent from reagent storage area 140a and 140b, respectively, to a reaction container on the reaction turntable 130. The various transfers occur by use of a pumping mechanism (not shown), such as a displacement pump, for example, attached to the transfer arms 110. Additionally, the system architecture 100 includes one or more controllers (not shown) for controlling operation of the various components, including the transfer arms 110, the probes, and the turntables.

Also included in the system architecture 100 is a reagent handling system 300, the details of which are further described herein below with reference to FIG. 3. Components of the reagent handling system 300 shown in the system architecture 100 of FIG. 1 are a reagent server module 310, a gripper assembly 321, a horizontally-extending transfer arm 350, and a tray 331.

The system architecture 100 of FIG. 1 and the accompanying description are purely exemplary and non-limiting to the transfer and opening method and apparatus disclosed herein. The system architecture 100 is just one example system in which the transfer and opening method and apparatus may be implemented.

Figure 2:
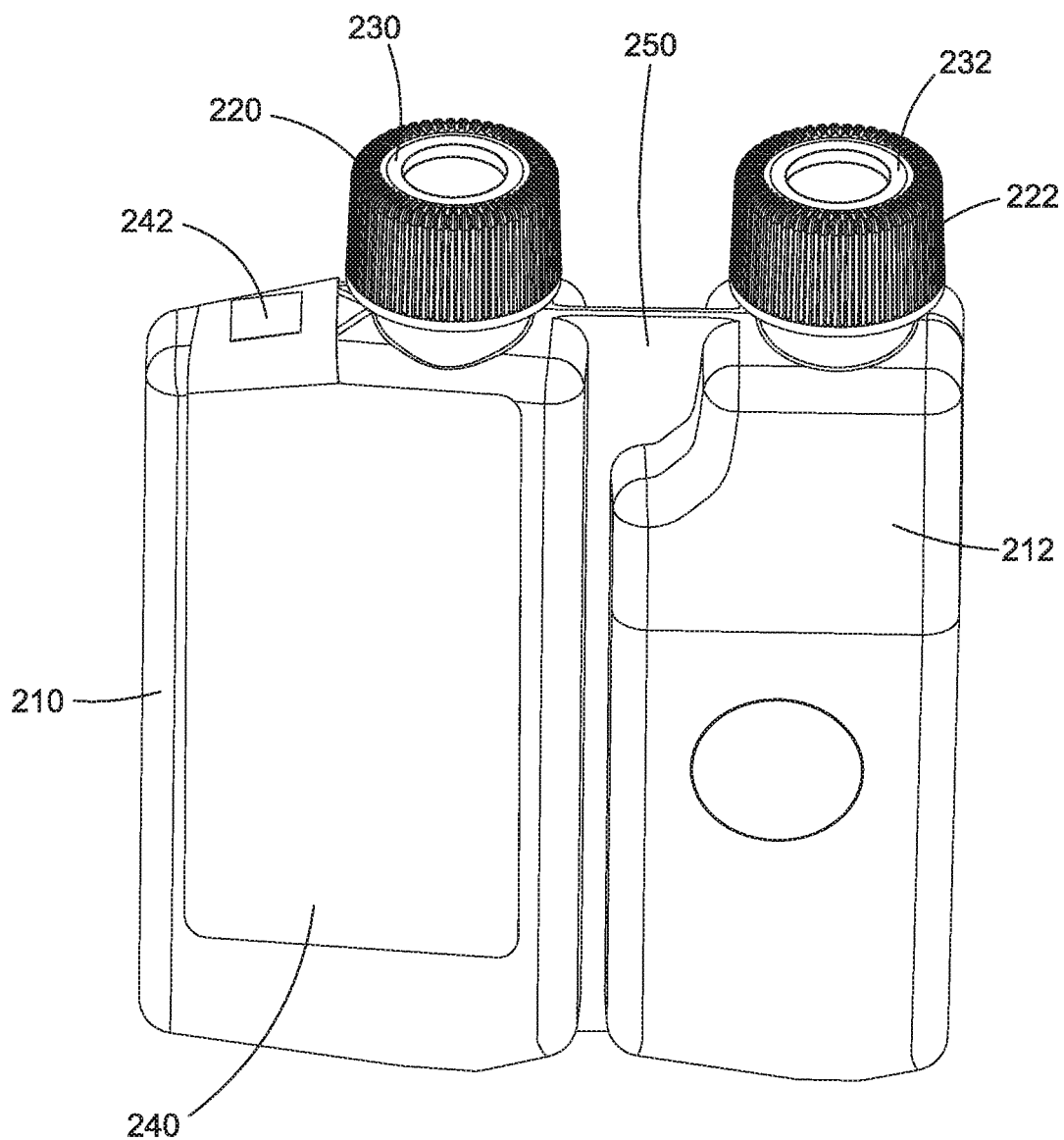
FIG. 2 is a diagram of an exemplary reagent container, according to embodiments.

FIG. 2 is a diagram of an exemplary reagent container 200 that may be used with the system architecture 100 and the reagent handling system 300 (described in detail below). Other types of containers or variations of the reagent container 200 may be used, and the reagent handling system 300 is not limited to use of the exemplary reagent container 200 described herein. Detailed features of the exemplary reagent container 200 are provided in PCT Patent Application Serial No. PCT/US14/019078, the contents of which are hereby included by reference in their entirety herein.

According to an embodiment, the reagent container 200 is comprised of two storage portions (or packs) 210, 212 configured to hold reagent fluids for a particular on-board diagnostic test on a clinical analyzer (e.g., the system architecture 100). The reagent container 200 also includes caps 220, 222 for each pack 210, 212, respectively. The caps 220, 222 include seals 230, 232, respectively. A label 240 may be provided and may include a barcode label 242 for inventory purposes. In an embodiment, the label 240 is positioned on one of the packs 210, 212 with the barcode label 242 positioned on an upper surface of the pack 210, 212 on which the label 240 is placed. The barcode label 242 may be on any surface of the pack or packs 210, 212 that is accessible by a barcode reader. A webbed gripping portion 250 extends between the two storage packs 210, 212 and is, in an embodiment, a substantially flat surface that may have one or more protrusions or gripping portions provided thereon.

Figure 3:
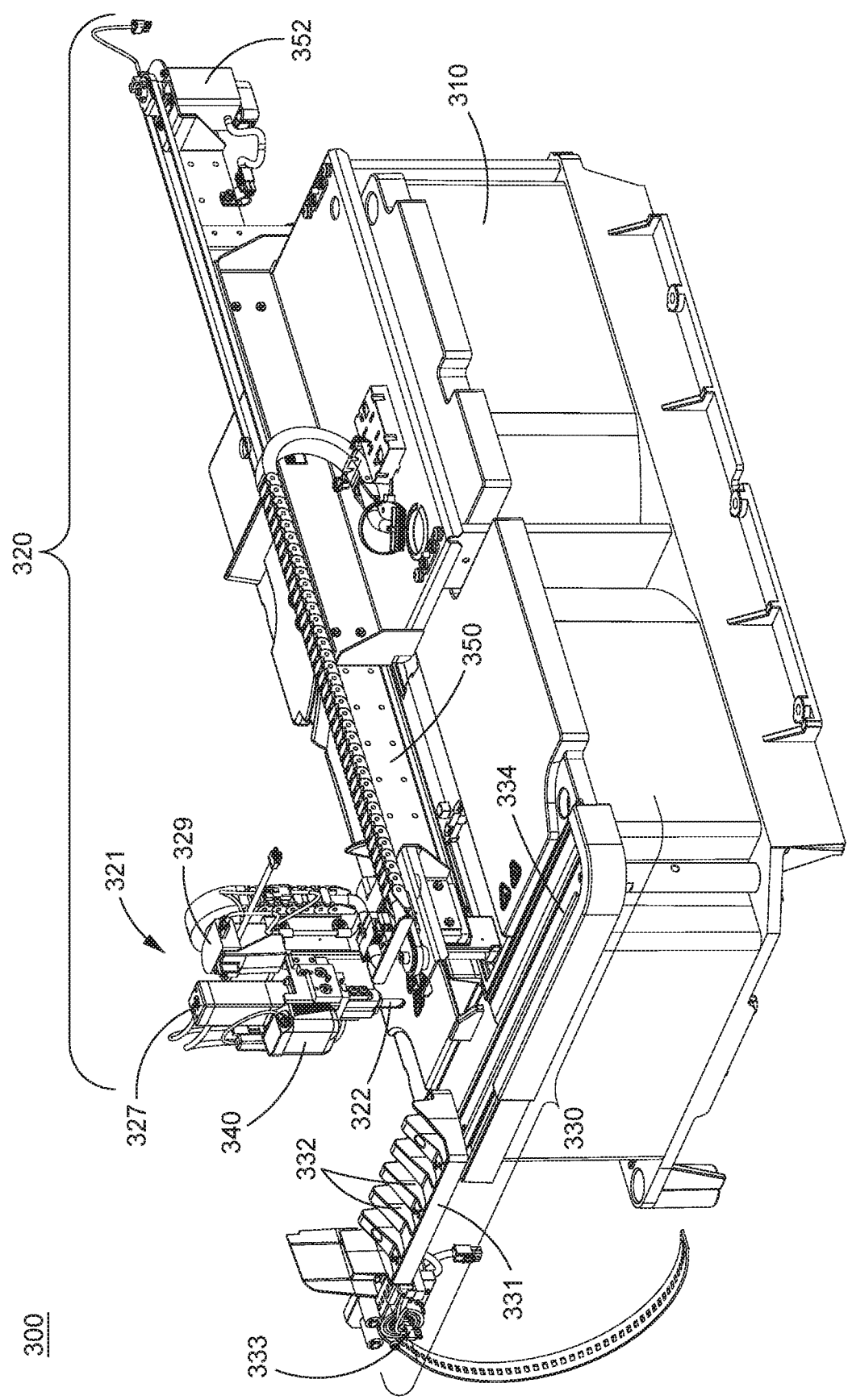
FIG. 3 is a diagram illustrating features of a reagent handling system, according to embodiments herein.

Turning to FIG. 3, the reagent handling system 300, according to embodiments provided herein, is illustrated. According to an embodiment, the reagent handling system 300 transfers one or more of the containers 200 to and/or from a clinical analyzer (e.g., the reagent storage areas 140a and 140b of the system architecture 100 shown in FIG. 1).

The reagent handling system 300, according to an embodiment, includes a reagent server module 310, a reagent transfer arm apparatus 320, and a reagent load station 330. The reagent server module 310 is, in an embodiment, a refrigerated storage enclosure comprising one or more indexing rings for storing reagent containers 200. The reagent transfer arm apparatus 320 provides a linear transfer of the reagent containers 200. The reagent load station 330 is provided for loading and unloading one or more reagent containers 200.

In an embodiment, the reagent load station 330 comprises a tray 331 with one or more tray spaces 332. Each of the tray spaces 332 is configured to hold a respective reagent container 200. In another embodiment, the tray 331 is a flat surface with sufficient space for holding one or more reagent containers 200. The reagent load station 330, according to an embodiment, further comprises a tray motor 333 coupled to the tray 331 and configured to move the tray 331 in a horizontal direction between a load/unload point and one or more transfer points. A loader track 334, in an embodiment, is a surface on which the tray 331 is held and moves.

In an embodiment, the reagent load station 330, and in particular the tray 331, is accessible (e.g., at the load/unload point) to an operator for manual loading and unloading of reagent containers 200 to and from the tray 331.

With continued reference to FIG. 3, the reagent transfer arm apparatus 320 is illustrated. The reagent transfer arm apparatus 320 includes a gripper assembly 321 configured to grasp, one at a time, the gripping portion 250 of each of the one or more reagent containers 200 and move each of the one or more reagent containers 200 to and from a respective one of the one or more tray spaces 332 at, for example, a corresponding transfer point. In another embodiment, the reagent transfer arm apparatus 320 interfaces with an automated track system, which may provide for the loading and unloading of the reagent containers 200.

Figure 4:
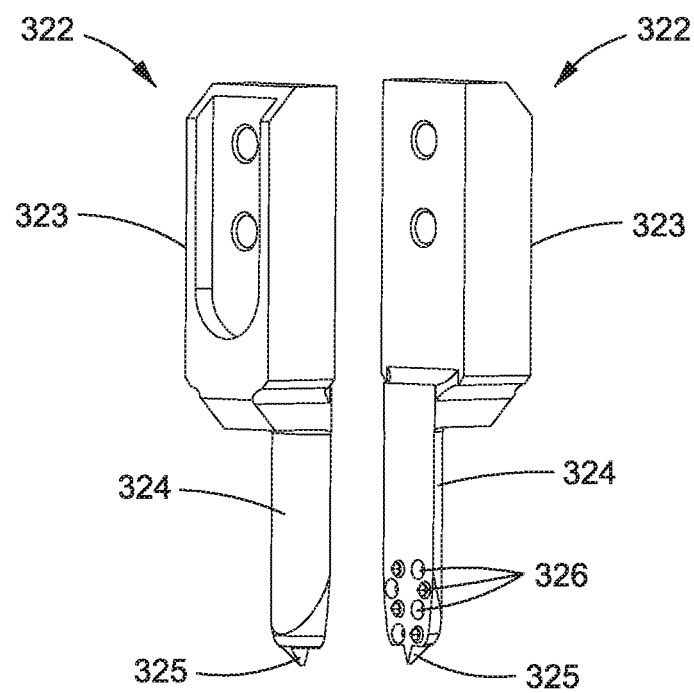
FIG. 4 is a diagram of gripper fingers for use in a reagent handling system, according to embodiments disclosed herein.

In an embodiment, the gripper assembly 321 includes a pair of gripper fingers 322 that are oriented vertically and opposite one another. FIG. 4 is a diagram of exemplary gripper fingers 322 for use in the reagent handling system 300, according to an embodiment. As shown in FIG. 4, in an embodiment, each gripper finger 322 is comprised of a support portion 323 that transitions to a narrower finger portion 324 with a tip 325 at an end portion thereof. The support portions 323 may include holes or slots for mounting to the reagent transfer arm apparatus 320. The pair of gripper fingers 322 are configured to move between a release (or open) position in which the pair of gripper fingers 322 are spread apart with respect to one another and a grip (or closed) position in which the pair of gripper fingers 322 are pushed together with respect to one another. The tip 325 of each gripper finger 322 is a sharp point such that, when the gripper fingers 322 are in the grip position, the gripper fingers 322 are able to puncture the seals 230, 232 of the caps 220, 222 of a reagent container 200.

In an embodiment, to facilitate gripping of the gripping portion 250 of the container 200 when in the grip position, the gripper fingers 322 may include, on opposing surfaces at distal ends (e.g., near or adjacent to the tips 325), a plurality of sharp, pointed protrusions and depressions 326, wherein the plurality of protrusions and depressions 326 on one of the pair of gripper fingers 322 is configured to mate with a plurality of opposing protrusions and opposing depressions 326 on the other of the pair of gripper fingers 322. To further increase friction between the fingers 322 and the container 200 to be gripped and transported, a distal end of one or more fingers 322 may include a high friction material, such as rubber.

Figure 5:
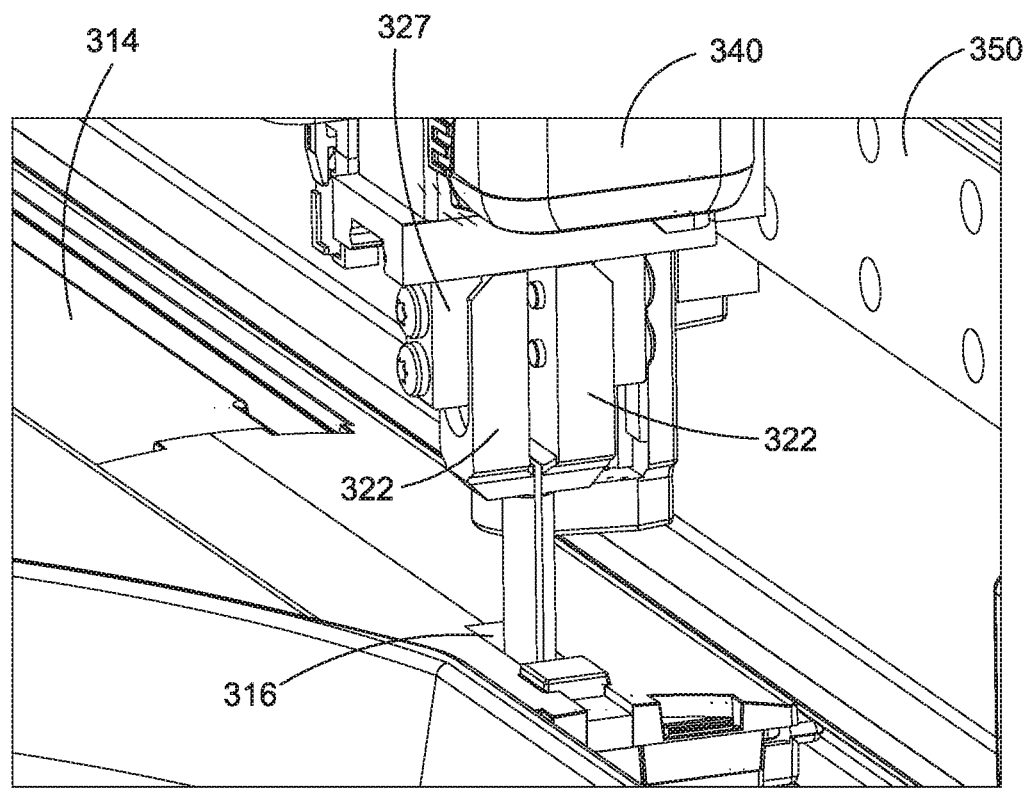
FIGS. 5-19 are a series of diagrams illustrating various aspects of use of a reagent handling system, according to embodiments disclosed herein.
Figure 6:
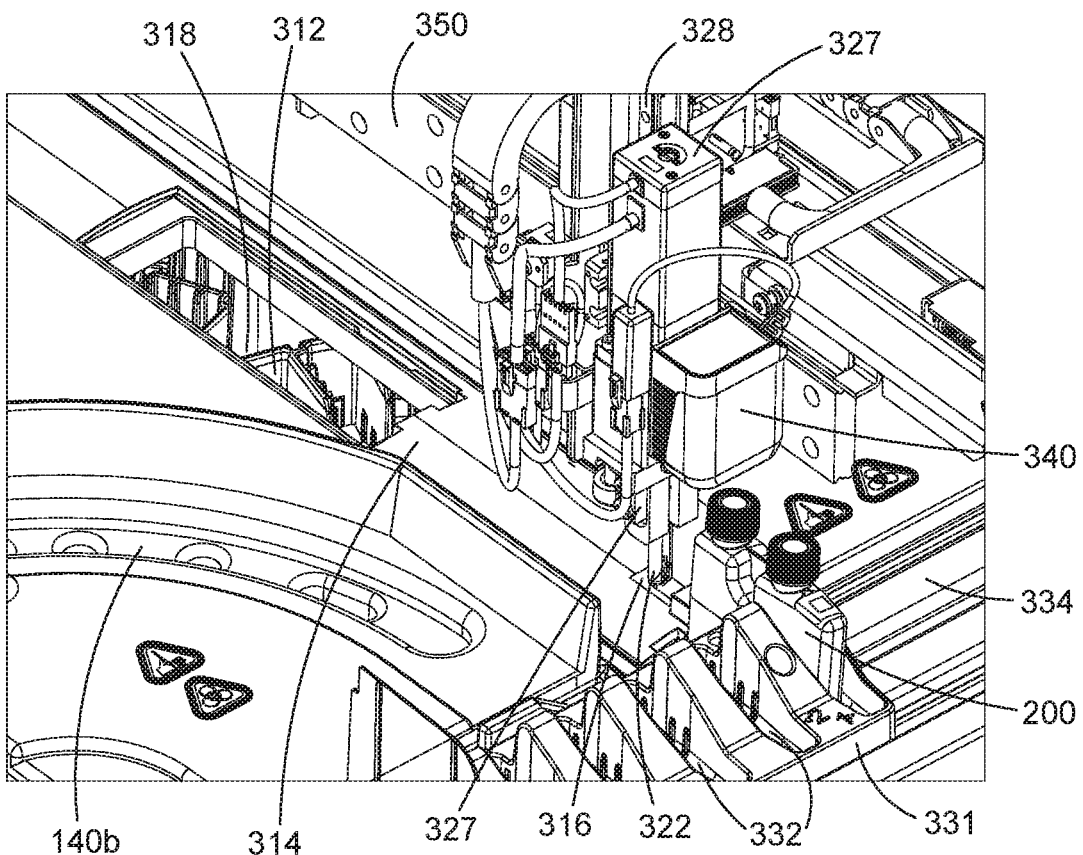
Figure 7:
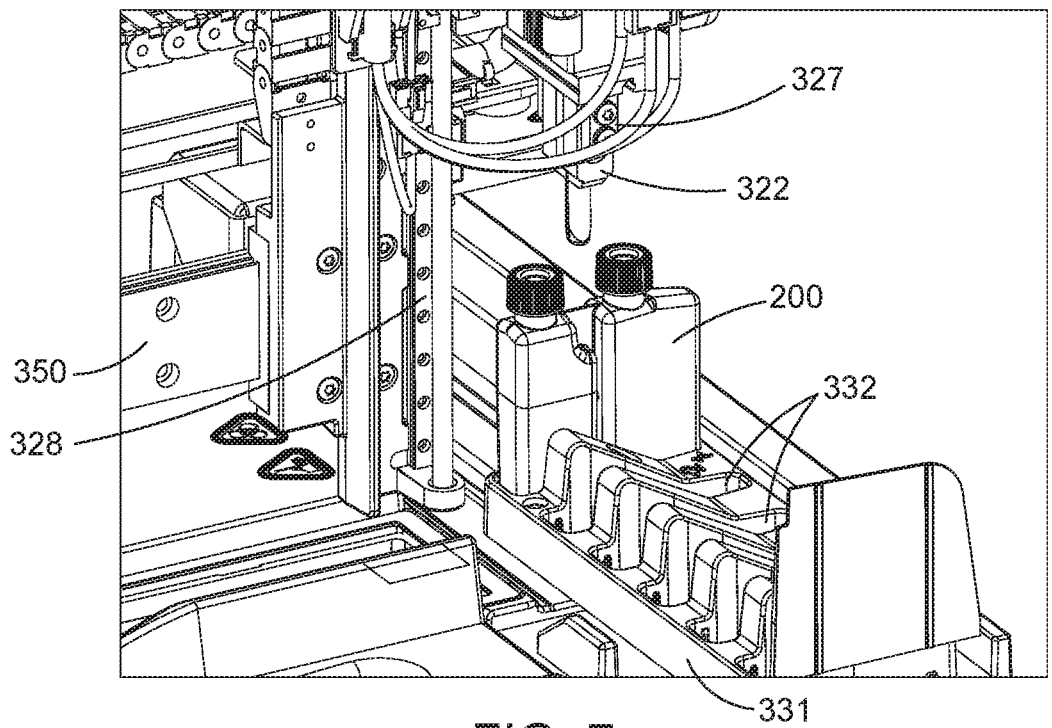

Turning back to the reagent handling system 300 of FIG. 3 (some of the features are more clearly shown in the close-up views of FIGS. 5-19), the gripper assembly 321, in addition to the gripper fingers 322, also includes a gripper actuator 327 comprising a gripper motor coupled to and configured to control the pair of gripper fingers 322 to move the pair of gripper fingers 322 between the release position and the grip position (also see, e.g., FIGS. 5, 6, 7). A vertically-extending frame 328 (see FIG. 6) is provided, to which the pair of gripper fingers 322 and the gripper actuator 327 are moveably coupled and along which the pair of gripper fingers 322 and the gripper actuator 327 move in a vertical direction. A vertical drive motor 329 (see FIG. 3) is configured to control the vertical movement of the pair of gripper fingers 322 and the gripper actuator 327 along the vertically-extending frame 328. As described in detail below, the vertical movement of the pair of gripper fingers 322 provides for insertion and removal of the one or more reagent containers 200 into and out of the tray 331 and the reagent server module 310; and for opening of the seals 230, 232 of the reagent containers 200.

The gripper assembly 321 further comprises a bar code scanner 340 configured to read a bar code label 242 on the reagent container 200. In an embodiment, the bar code scanner 340 reads a bar code label 242 on a particular reagent container 200 when the particular reagent container 200 is moved to a transfer point (i.e., when the reagent container 200 is moved via the tray 331 to a point beneath or in range of the bar code scanner 340).

With continued reference to the reagent handling system 300 of FIG. 3 and the more detailed views of FIGS. 5-19, the reagent transfer arm apparatus 320 further includes a horizontally-extending transfer arm 350 to which the gripper assembly 321 is moveably coupled and along which the gripper assembly 321 moves in a horizontal direction. A transfer arm motor 352 is configured to control horizontal movement of the gripper assembly 321 along the horizontally-extending transfer arm 350.

The reagent server module 310 portion of the reagent handling system 300 includes a storage enclosure comprising one or more indexing rings 318 comprising indexed spaces 312 (see FIGS. 6, 12, 13, 14, and 18, for example) to hold the one or more reagent containers 200. The indexing rings 318 divide the storage of the containers 200 into incremental stations, which act as receptacle compartments and maintain the location and separation of the reagent containers 200. As shown (see FIG. 6, for example, for more detail), the indexed spaces 312 are part of a ring 318 that moves beneath the ringed portions 140a, 140b of the reagent storage, at which point the reagents may be accessed for use in the system architecture 100.

The reagent server module 310, in an embodiment, includes a door 314 (see FIGS. 5 and 6) provided on an upper portion of the storage enclosure configured to move to an open position in which an interior portion of the storage enclosure is accessible and a closed position in which the interior portion of the storage enclosure is inaccessible. In an embodiment, the door 314 is a slide-able door, with a door notch 316, configured to slide open and closed by the gripper assembly 321 as further described below.

As shown in FIG. 3, the horizontally-extending transfer arm 350 of the reagent transfer arm apparatus 320 horizontally extends along a length of the reagent server module 310, and a length of the tray 331 is oriented perpendicular to a length of the horizontally-extending transfer arm 350. Of course, other physical configurations are possible, and the reagent handling system 300 is not limited to the physical configuration shown in FIG. 3.

In an embodiment, the reagent handling system 300 further includes a wash and dry station 360 (see FIG. 17) accessible to the gripper assembly 321 via the horizontal movement of the gripper assembly 321 along the horizontally-extending transfer arm 350. The wash and dry station 360 comprises a rinse station 362 configured to rinse the gripper fingers 322 and a drying station 364 configured to vacuum dry the gripper fingers 322. The operation of the wash and dry station 360 is described below with respect to FIG. 17.

In an embodiment, one or more controllers or processors may be part of a system architecture (e.g., the system architecture 100) to control operation of one or more motors and other components. One or more controllers are, in an embodiment, provided to control operation of the reagent load station 330 (i.e., the tray motor 333), the gripper assembly 321 (i.e., the gripper actuator 327 with the gripper motor, the vertical drive motor 329, the barcode scanner 340), the transfer arm motor 352, and the one or more indexing rings 318 to provide for transfer of the one or more reagent containers 200 between the tray 331 and the one or more indexing rings 318. The one or more controllers may communicate with a local controller and/or a central controller.

In an embodiment, one or more of the motors (e.g., the tray motor 333, the gripper actuator 327 with the gripper motor, the vertical drive motor 329, and the transfer arm motor 352) may be an encoder with a stepper motor.

With reference to FIGS. 5-19, the reagent handling system 300 is shown at various points of unloading, loading, and opening processes, according to embodiments provided herein.

FIG. 5 illustrates the gripper fingers 322 in a grip (i.e., closed) position inserted in the door notch 316 of the door 314. Once inserted, the transfer arm motor 352 operates to horizontally move the gripper assembly 321 along the horizontally-extending transfer arm 350 to slide open the door 314.

FIG. 6 shows the door 314 in the open position, exposing the interior of the reagent server module 310 (e.g., the ring 318 and the spaces 312). An indexed space 312 of a ring 318 is shown to be empty and accessible. The gripper fingers 322 remain in the door notch 316. A reagent container 200 is on the tray 331 in a tray space 332.

According to one embodiment, the reagent transfer arm gripper fingers 322 index to the release (i.e., open) configuration and move to a load/unload position above a reagent server ring 318. The gripper fingers 322 travel into the reagent server module 310 and grip a reagent container 200, which may be empty or needs to be removed. The gripper fingers 322 close to create a pinch at opposing sides of the reagent container 200 gripping portion 250, found between the caps 220, 222 of the reagent container 200, according to an embodiment. The reagent container 200 is lifted from the ring 318 and moved to a trash station (not shown) or returned to the reagent load station 330 (e.g., the tray 331) for disposal by an operator.

Upon determining that a particular reagent is required to be replenished or added to the on-board inventory of one of the rings 318 (via a controller, for example), the gripper assembly 321 is moved horizontally along the horizontally-extending transfer arm 350 to the reagent load station 330.

In an embodiment, the barcode scanner 340 scans the barcode labels 242 of the reagent container 200 on the tray 331 for the availability of a reagent container 200 which contains the needed reagent (i.e., method or formulation). The tray 331 is indexed laterally as the barcode scanner 340 scans for the presence of a reagent container 200 with a barcode label 242 that meets the requirements for the needed reagent. Upon detecting the barcode label 242 that satisfies the requirements, the reagent handling system 300 determines, according to an embodiment, the location in the ring 318 for the reagent container 200, via one or more of the controllers. The ring 318 is then rotated by one of the one or more controllers so that the position (i.e., the indexed space 312) is at a position equivalent to the load/unload position above the reagent server ring 318.

With reference to FIG. 7, the gripper fingers 322 are positioned (via the reagent transfer arm apparatus 320) above the container 200 found present on the tray 331 of the reagent load station 330.

Figure 8:
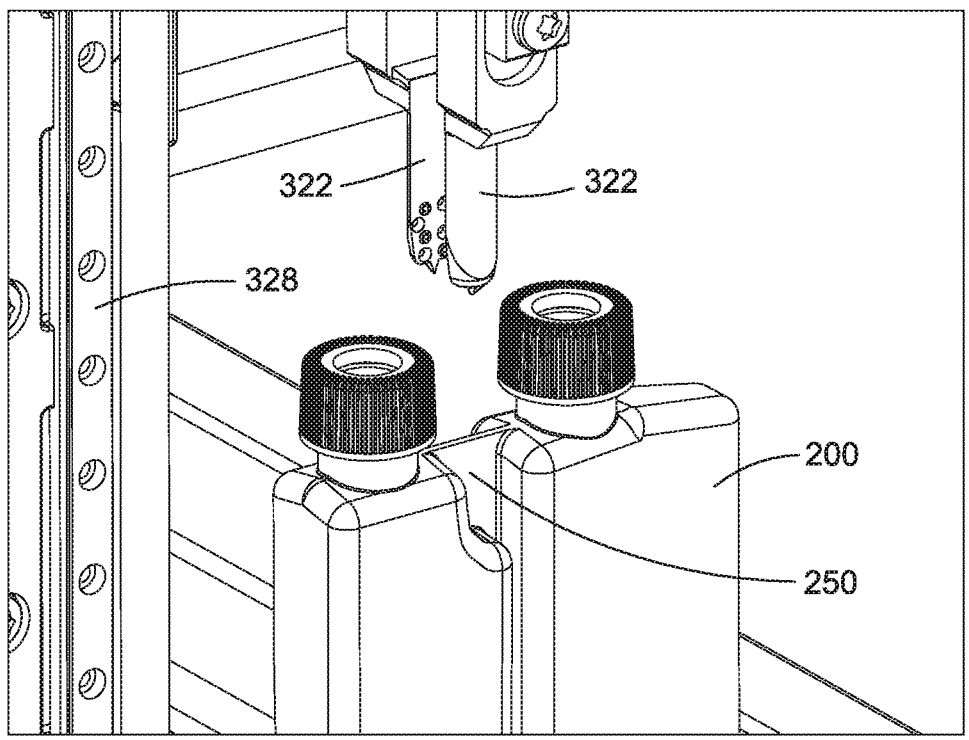

As shown in FIG. 8, the gripper fingers 322 index to the release position via the gripper motor of the gripper actuator 327.

Figure 9:
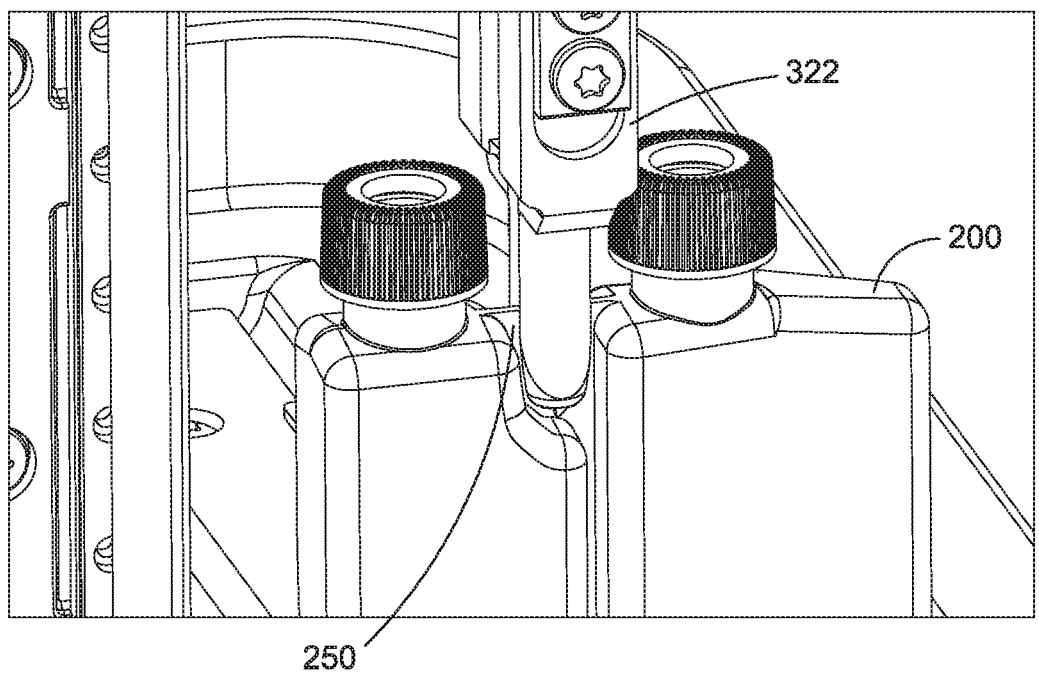

As shown in FIG. 9, the gripper fingers 322 travel vertically downward, via the vertical drive motor 329, to a location in which the gripper fingers 322 are located on either side of the gripping portion 250 of the reagent container 200. The gripper fingers 322 close to the gripping position to grip the gripping portion 250 of the reagent container 200.

Figure 10:
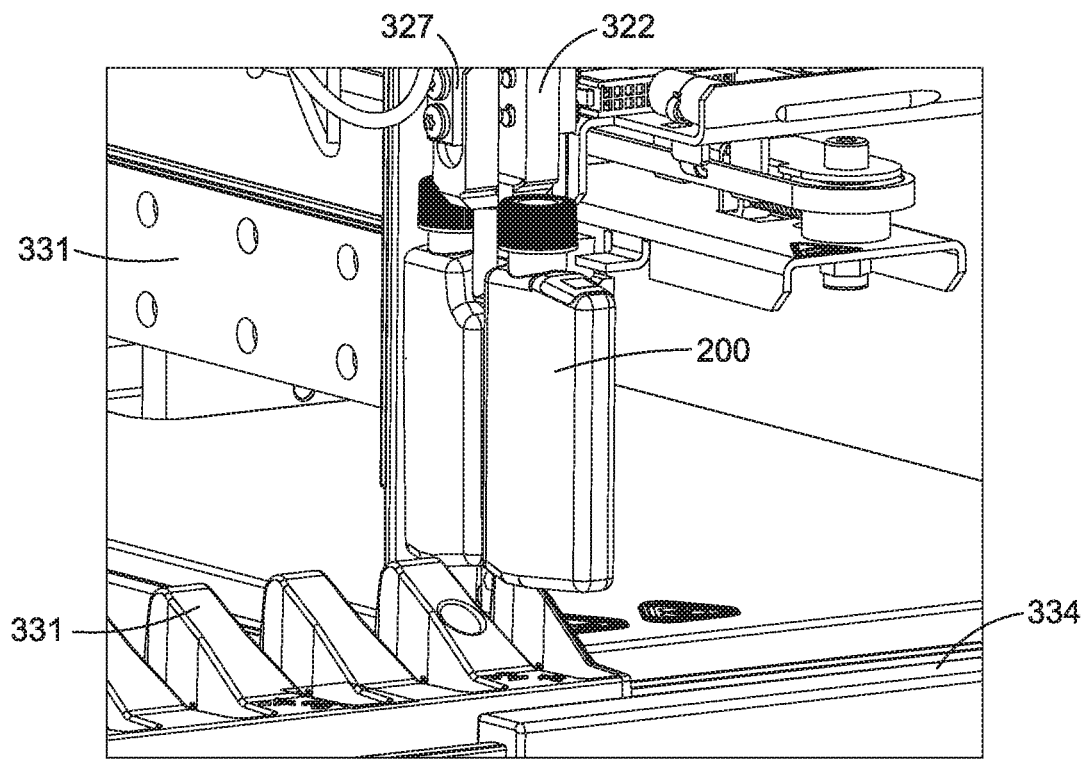

As shown in FIG. 10, the gripper fingers 322 with the gripped reagent container 200 are lifted (via the vertical drive motor 329).

Figure 11:
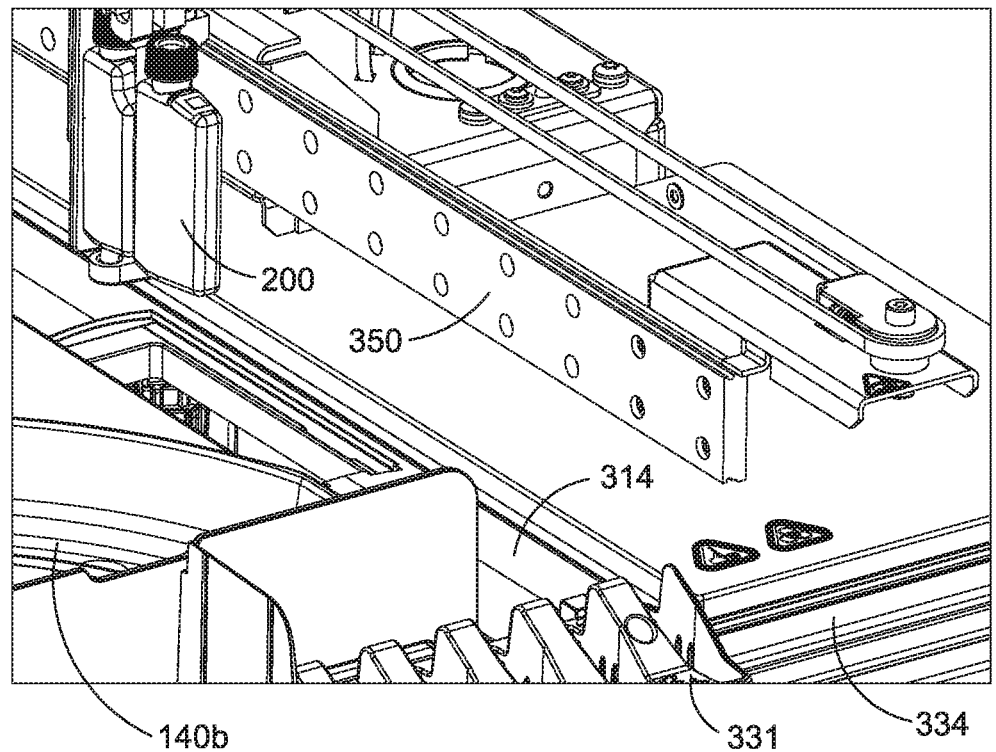

FIG. 11 illustrates a portion of the gripper assembly 321, with the gripped reagent container 200, moved along the horizontally-extending transfer arm 350 via the transfer arm motor 352 to the load/unload position above the reagent ring 318.

Figure 12:
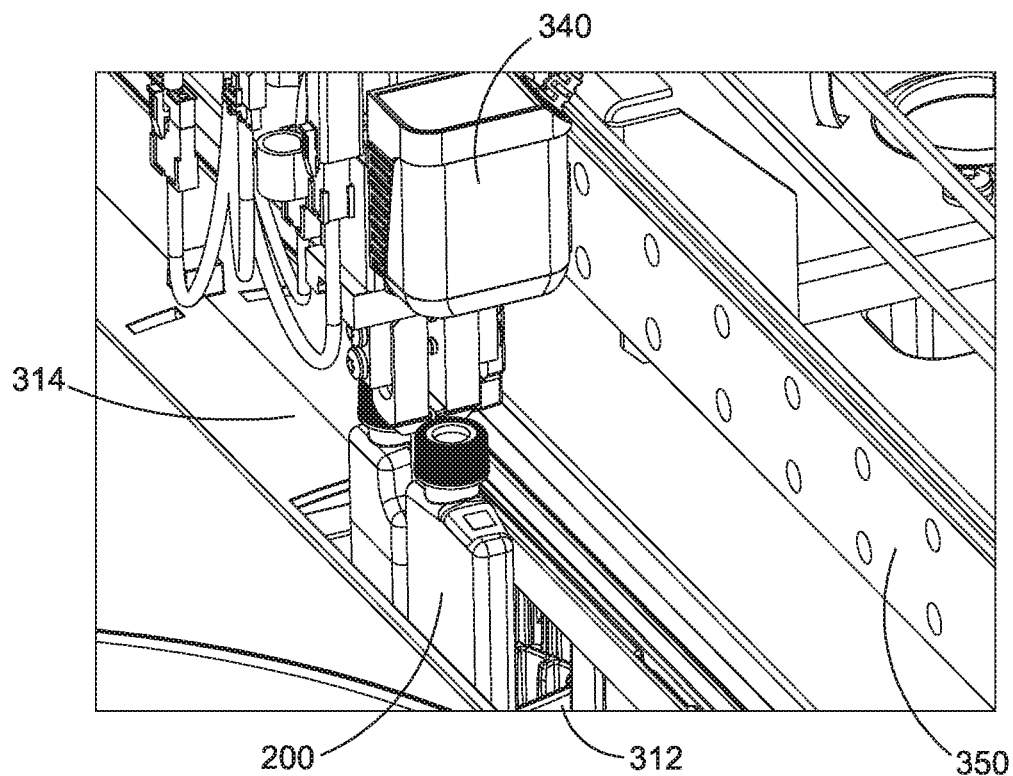
Figure 13:
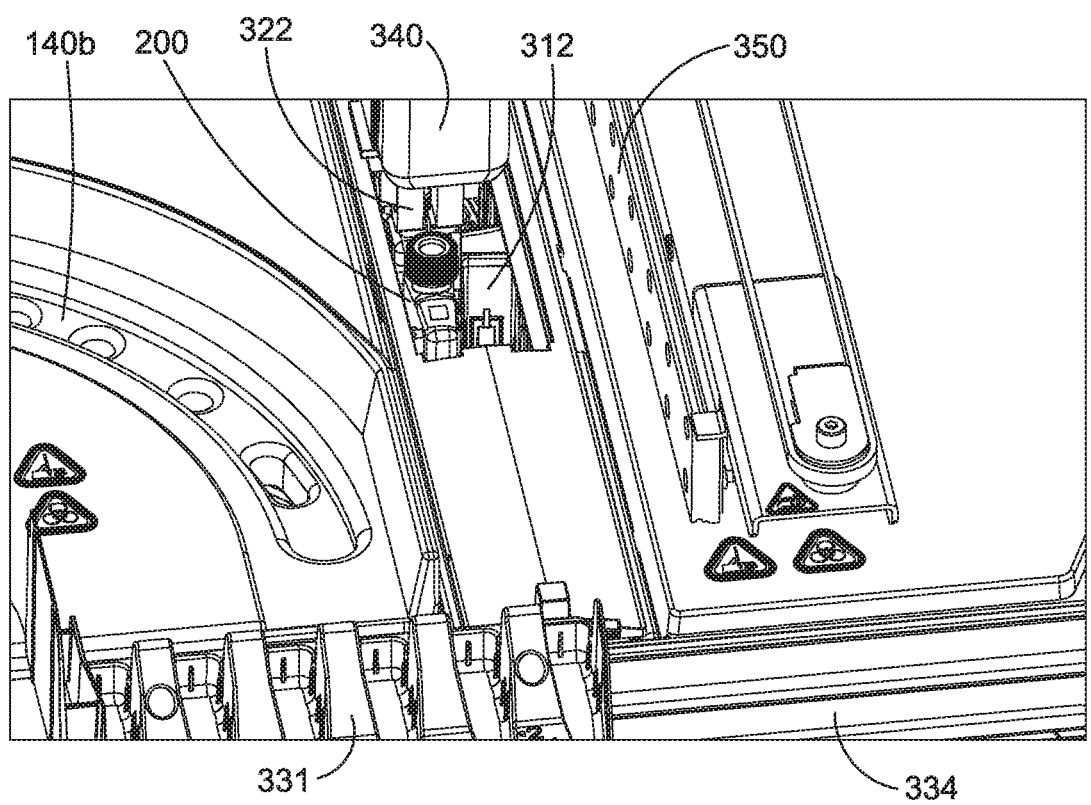
Figure 14:
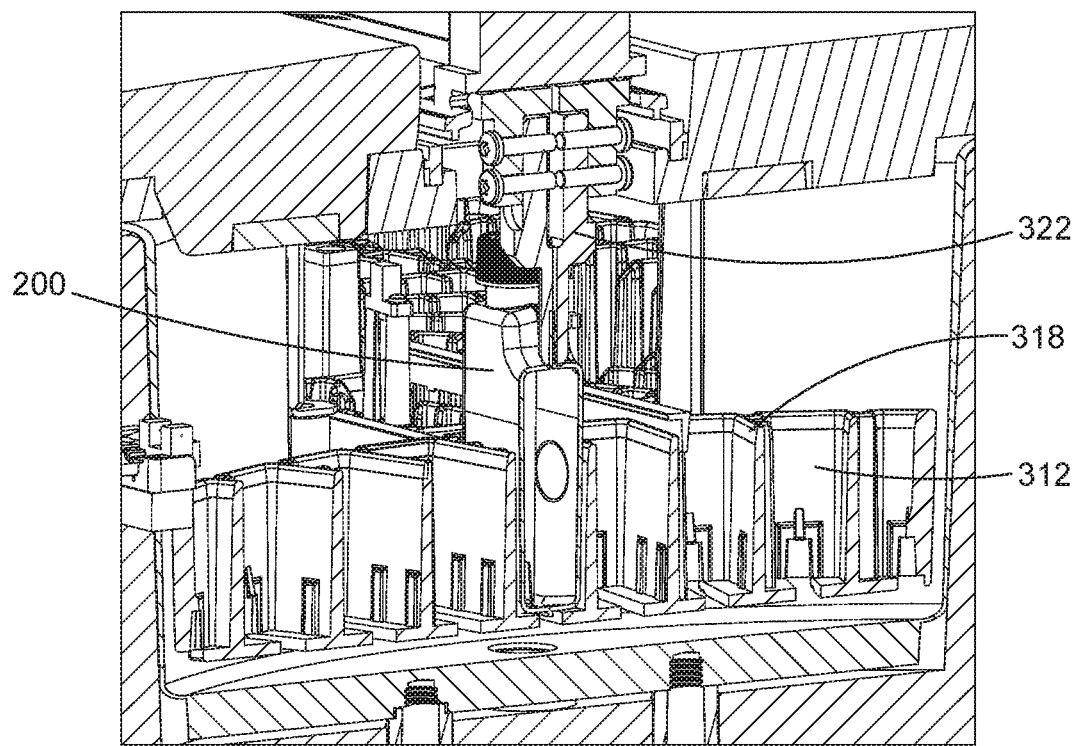

FIGS. 12-14 illustrate the vertical downward placement of the gripper fingers 322 and the gripped reagent container 200 into the indexed space 312 that was previously moved into position.

At some time after one or more of the reagent containers 200 are placed in the ring 318, the gripper assembly 321 operates to open one or more of the reagent containers 200. In an embodiment, the gripper fingers 322 are moved to a position above one of the caps 220, 222 of the reagent container 200.

Figure 15:
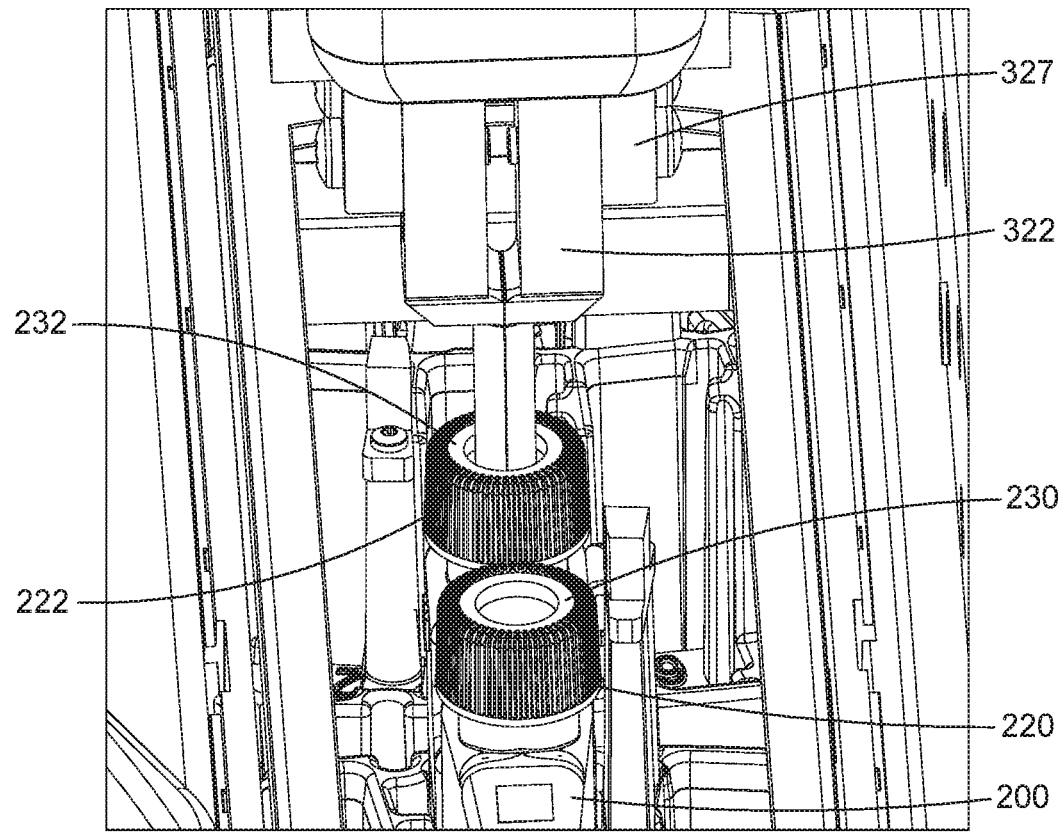
Figure 16:
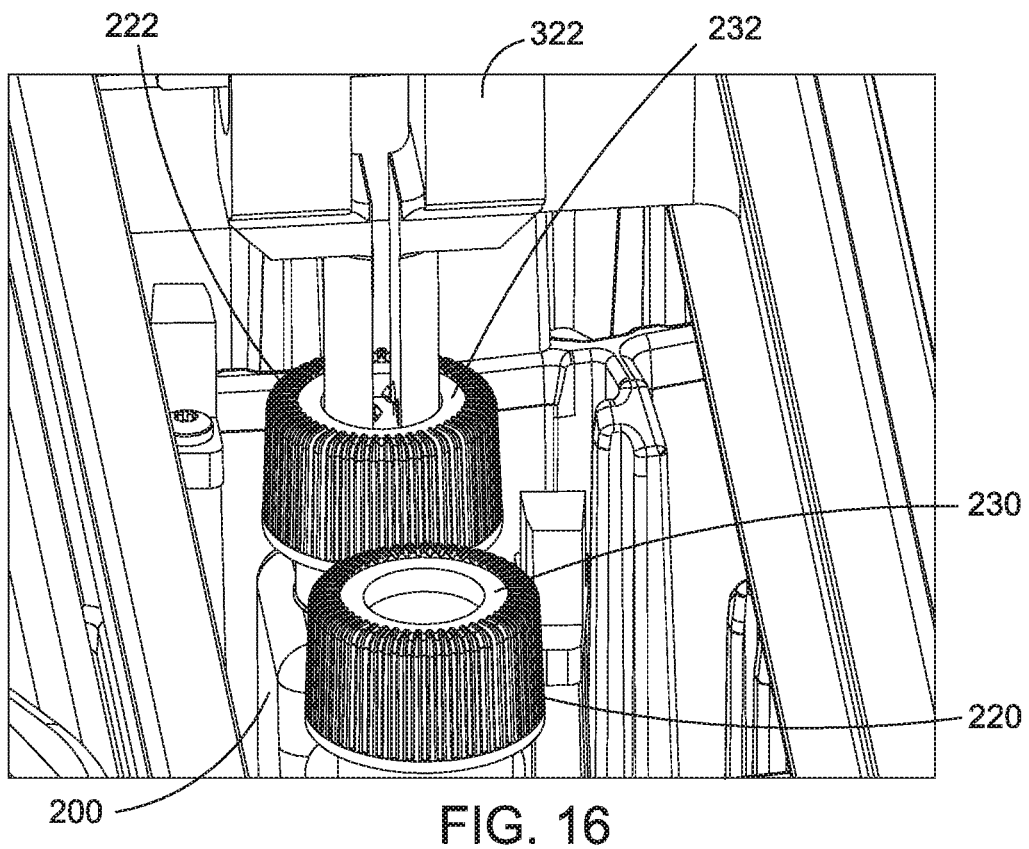

FIGS. 15 and 16 illustrate a seal opening process, according to an embodiment. The gripper fingers 322 are closed together in the grip position to form a sharp point to puncture the seal 232 of the cap 222 of the reagent container 200. The closed gripper fingers 322 are lowered and inserted into the cap 222, puncturing the seal 232 with the sharp point formed by the closed gripper fingers 322 (see FIG. 15). As shown in FIG. 16, the gripper fingers 322, while still in the cap 222, are moved apart slightly, within the limits of the opening of the cap 222, to spread open the seal 232 to a more fully opened position, thus providing unobstructed access to the reagent contained in the reagent container 200 and to reduce friction, which could result in lifting of the container 200 when the gripper fingers 322 are being withdrawn.

The gripper fingers 322 are closed and then lifted vertically and may move to a position above the other cap/seal 222/232 to puncture the seal 232, if so desired or necessary. This second opening process may be delayed, as controlled by one of the one or more controllers.

Figure 17:
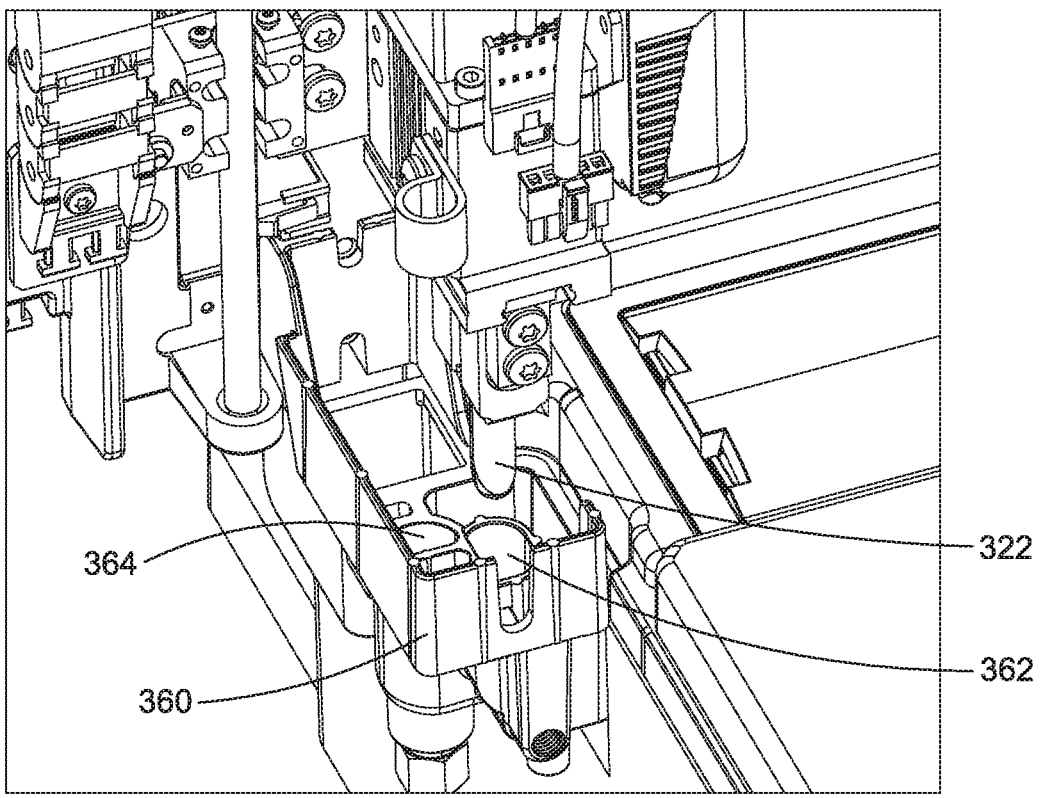

The gripper assembly 321 is vertically lifted from the reagent container 200, along the vertically-extending frame 328 via the vertical drive motor 329, and is moved along the horizontally-extending transfer arm 350 via the transfer arm motor 352 to the wash and dry station 360 (see FIG. 17). The gripper fingers 322 are, in an embodiment, inserted downward into the rinse station 362 and are rinsed while repeatedly moving between an open and closed position, to ensure thorough cleaning. The gripper fingers 322 are then moved to the dry station 364, where they are vacuum dried (in an open position in one embodiment) before exiting.

Figure 18:
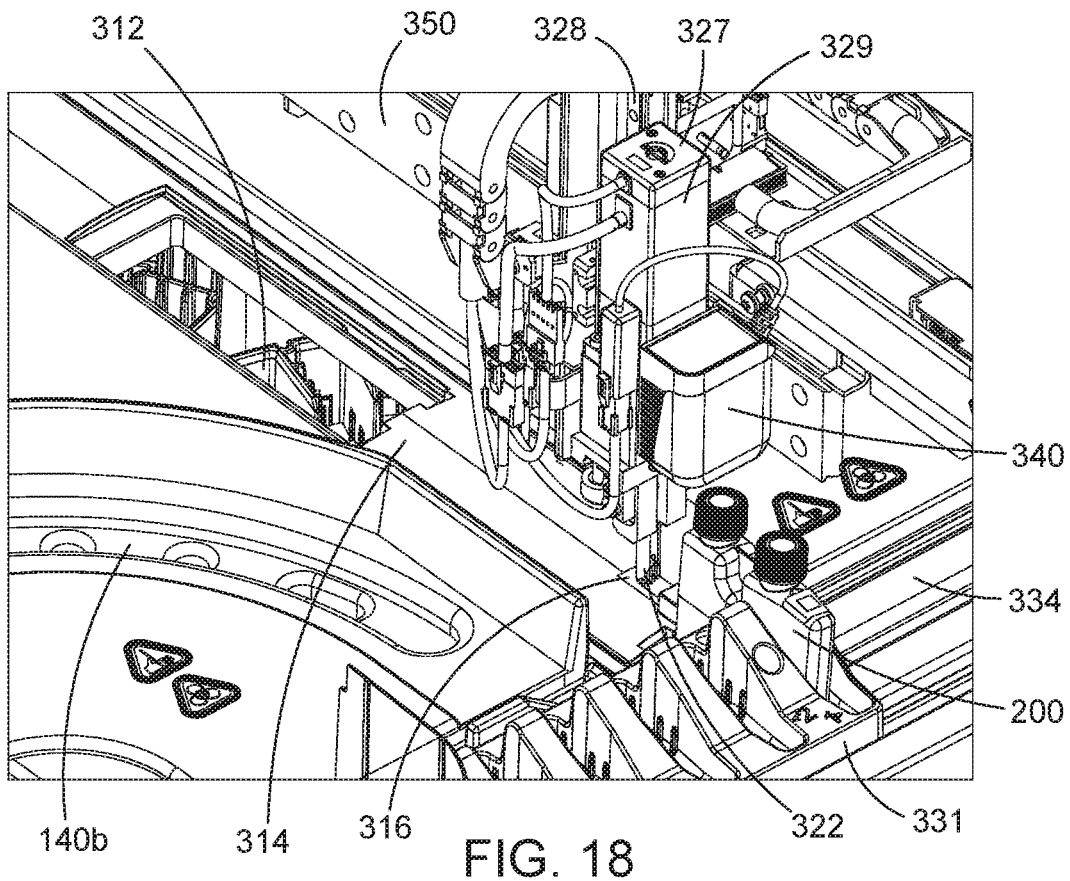
Figure 19:
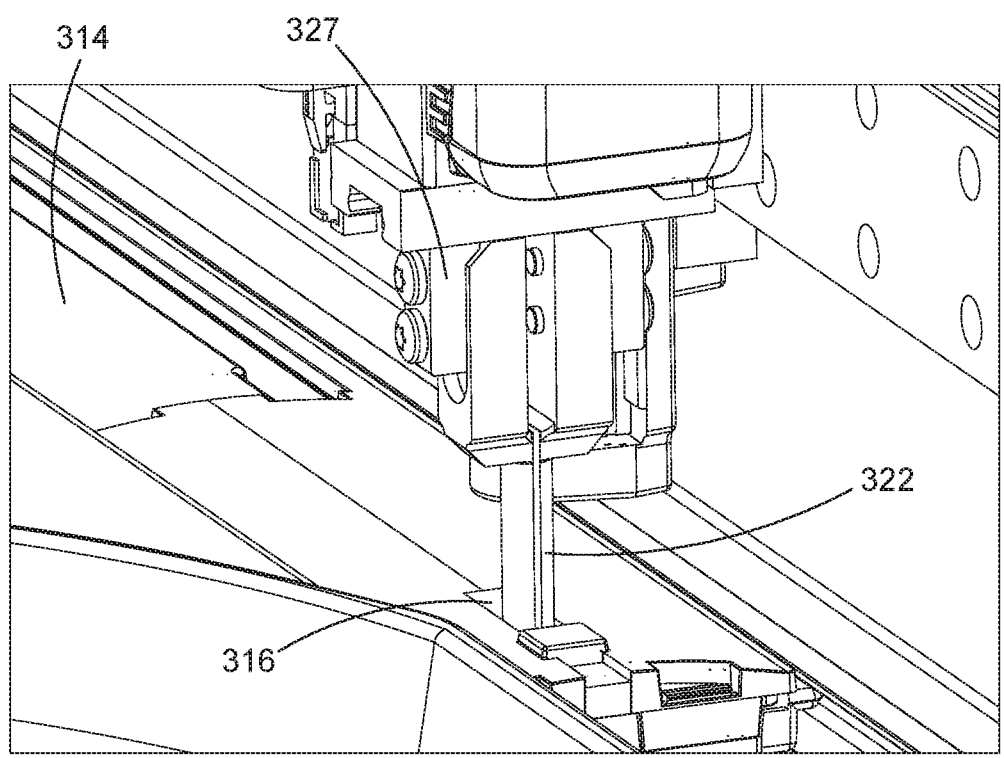

As shown in FIG. 18, the gripper fingers 322 are closed, and the gripper assembly 321 moves laterally to the door notch 316, into which the gripper fingers 322 are positioned to close the door 314. The gripper assembly 321 is moved laterally along the horizontally-extending transfer arm 350 to move the door 314 to a closed position (see FIG. 19).

Various connection pieces, such as electrical connectors and the like, are also shown in the figures.

Figure 20A:
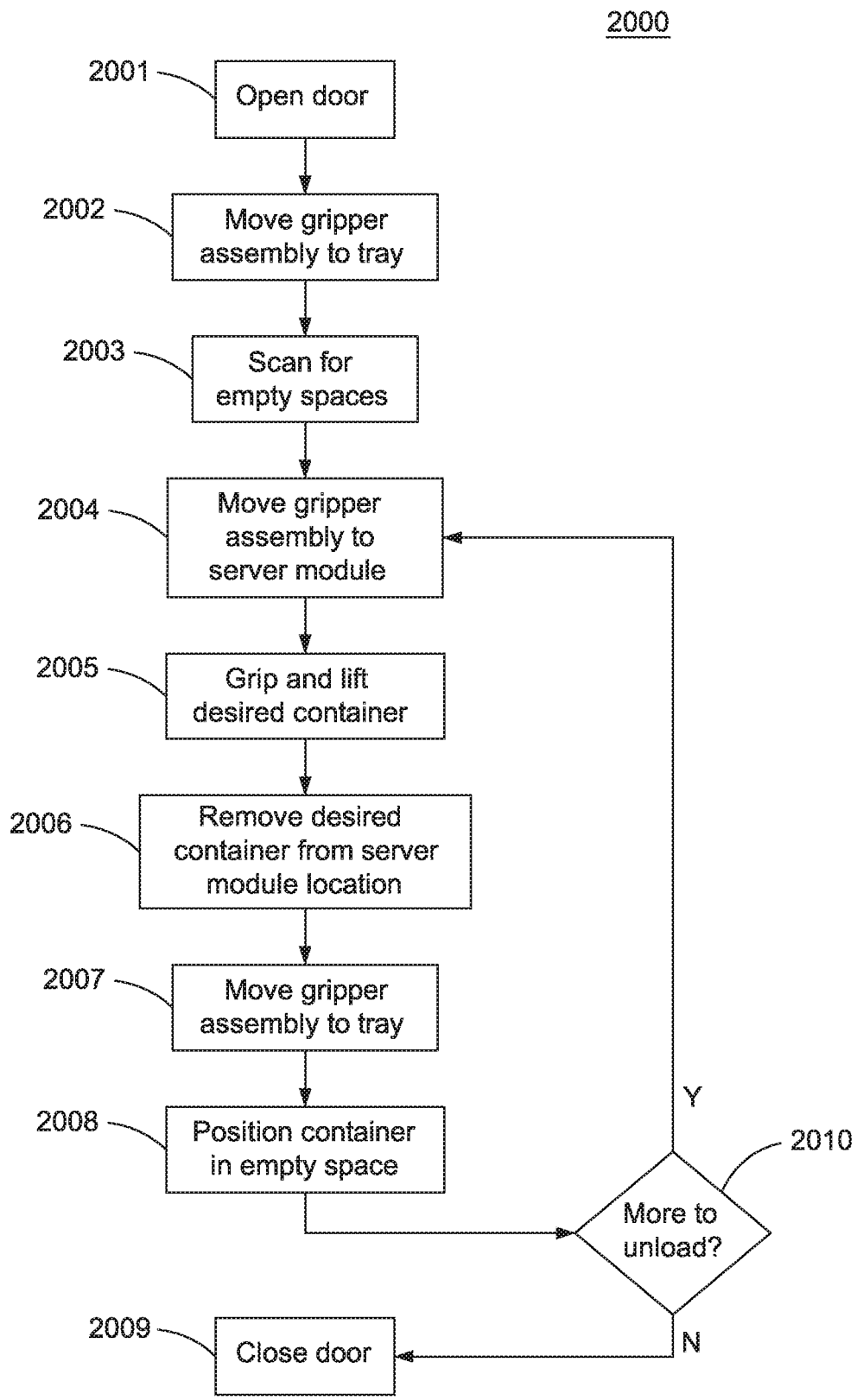
FIG. 20A is a flow diagram illustrating a method of unloading reagent containers in a clinical analyzer in an in vitro diagnostics (IVD) environment, according to an embodiment.

FIG. 20A is a flow diagram 2000 illustrating a method of unloading reagent containers 200, according to an embodiment, in, for example, an IVD environment. The method utilizes various aspects of the reagent handling system 300 described herein.

At 2001, the gripper assembly 321 opens the door 314 of the reagent server module 310. At 2002, the gripper assembly 321 is moved to the tray 331 of the reagent load station 330. In an embodiment, this may be at an end portion of the horizontally-extending transfer arm 350. At 2003, the barcode scanner 340 scans the tray 331 for empty spaces as the tray 331 is laterally moved along the tray track 334.

At 2004, the gripper assembly 321 is moved to the reagent server module 310. At 2005, a desired container 200 is gripped and lifted by the gripper assembly 321. At 2006, the gripper assembly 321 removes the desired container 200 from the reagent server module 310.

At 2007, the gripper assembly 321 is moved back to the tray 331 to deposit the gripped container 200. At 2008, the container 200 is positioned in an empty space of the tray 331, which was previously identified during the scanning operation at 2003.

The door 314 is closed at 2009 following a determination at 2010 that there are no more containers 200 that need to be unloaded from the reagent server module 310. If, instead, there are containers 200 that need to be unloaded, as determined at 2010, the gripper assembly 321 moves back to the reagent server module at 2004 and the steps for moving an unneeded or empty reagent container 200 are repeated. This process may occur until, for a given operation, all of the reagent containers 200 that need to be removed are removed and deposited in empty spaces of the tray 331.

Figure 20B:
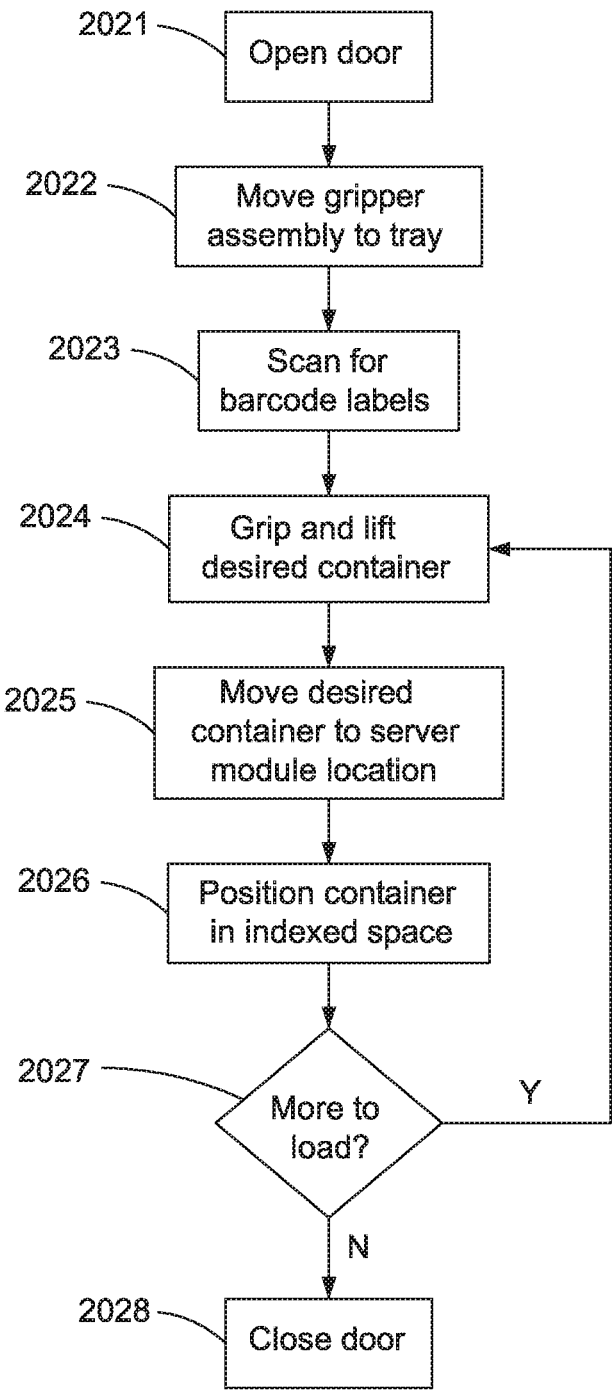
FIG. 20B is a flow diagram illustrating a method of loading reagent containers in a clinical analyzer in an in vitro diagnostics (IVD) environment, according to an embodiment.

FIG. 20B is a flow diagram 2020 illustrating a method of loading reagent containers 200, according to an embodiment, in, for example, an IVD environment. The method utilizes various aspects of the reagent handling system 300 described herein.

At 2021, the gripper assembly 321 opens the door 314 of the reagent server module 310. At 2022, the gripper assembly 321 is moved to the tray 331 of the reagent load station 330. At 2023, the barcode scanner 340 scans the tray 331 to locate a desired reagent container 200 as the tray 331 is laterally moved along the tray track 334.

At 2024, the gripper assembly 321 grips and lifts the desired container 200. At 2025, the gripper assembly 321 moves the desired container 200 to the reagent server module 310. At 2026, the container 200 is positioned in an indexed space 312.

At 2027, a determination is made as to whether there are more containers 200 to load into the reagent server module 310. If additional loading is necessary, the process continues to 2024 where the gripper assembly 321 grips and lifts another desired container 200 from the tray 331. If, however, no additional loads are needed at this time, at 2028, the gripper assembly 321 closes the door 314.

Figure 20C:
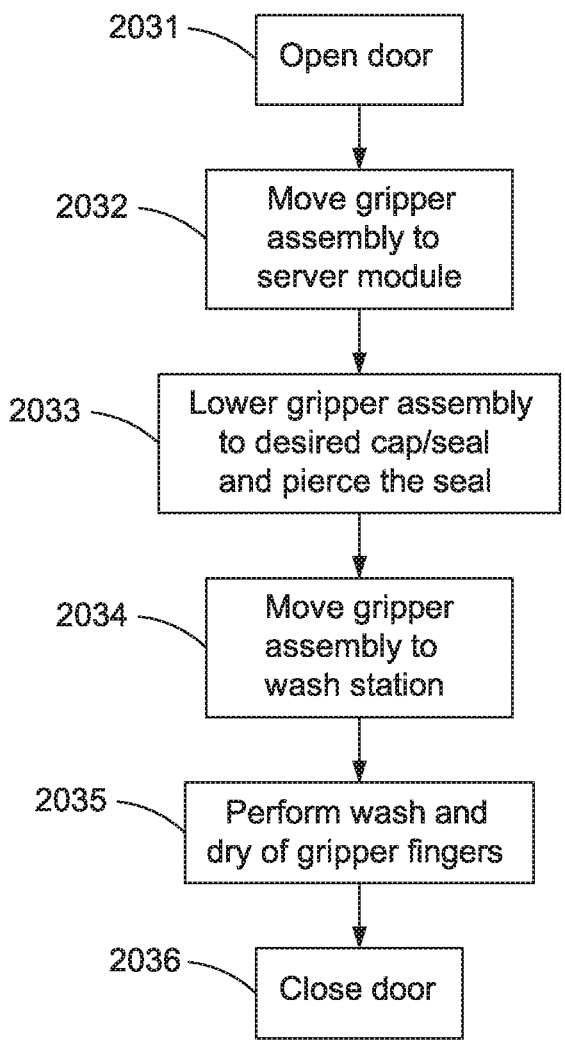
FIG. 20C is a flow diagram illustrating a method of opening reagent containers in a clinical analyzer in an in vitro diagnostics (IVD) environment, according to an embodiment.

FIG. 20C is a flow diagram 2030 illustrating a method of opening reagent containers 200, according to an embodiment, in, for example, an IVD environment. The method utilizes various aspects of the reagent handling system 300 described herein.

At 2031, the gripper assembly 321 opens the door 314 of the reagent server module 310. At 2032, the gripper assembly 321 is moved to the reagent server module 310. At 2033, the gripper assembly 321 is lowered to a desired cap/seal 220/230, 222/232 of a container 200 and pierces the seal 230, 232.

At 2034, the gripper assembly 321 is moved to the wash station 360. At 2035, a wash and dry of the gripper fingers 322 is performed.

At 2036, the gripper assembly 321 closes the door 314.

A summary of a method of providing a reagent fluid to an instrument inventory, according to embodiments herein, is as follows: An operator is prompted to load a new, unexpired container 200 of a required reagent. The container 200 is scanned to verify accuracy of the reagent. The gripper fingers 322 close and move into position and slide open a door 314 of the storage enclosure. The gripper fingers 322 move into position above the reagent container 200, the fingers 322 open, and the fingers 322 move downward to a position straddling either side of the gripping portion 250 of the container 200. The gripper fingers 322 close to pinch the container gripping portion 250. The gripper fingers 322 lift the container 200 from the reagent load station 330. The gripper assembly 321 transfers the container 200 into position above the storage enclosure (i.e., the rings 318) of the reagent sever module 310. The reagent ring 318 rotates to an empty position, and the gripper fingers 322, while continuously holding the container 200 by the gripping portion 250, travel downward to place the container 200 into an empty reagent ring space 312. The gripper fingers 322 separate to an open position and this releases the container 200. The gripper fingers 322 travel up and out of the refrigerated storage enclosure. The gripper fingers 322 then travel to the door notch 316 and reclose the storage sliding door 314. The gripper fingers 322, now at a retracted position, travel to a home position (a waiting position) for the next transfer call from either manual operator or instrument automation (i.e., a controller).

A summary of a method of opening a reagent container 200 is as follows: The reagent gripper fingers 322 travel upward and linearly along the container position while centering at a center hole position of the cap 220, 222 of the container 200. The gripper fingers 322 close and form a sharp-tipped bullet shape or point. The gripper fingers 322 move down, perforate and pass through the seal 230, 232. While in the penetration position entering at the throat of the container 200, the gripper fingers 322 open to increase the opening size of the seal 230, 232 and close to exit the container cap 220, 222 and seal 230, 232. The gripper assembly 321 travels to the gripper wash and dry station 360 for rinsing and drying of the gripper fingers 322.

The method and apparatus provided herein have several advantages. Advantageously, the method and apparatus provided herein result in preventing instrument utilization losses, resulting in increased total volume of reagent sales. The automated method and apparatus reduce on-site hazards and errors, as well as repetitive motion injuries to laboratory personnel. Moreover, there is a reduction in testing and instrument time-loss, as well as an increase in reagent life, usability, stability, and reliability.

According to embodiments provided herein, the method and apparatus provide for inventorying a supply of a certain reagent and removal for replacement of an empty container. The efficiency of placement and opening of a new reagent fluid container is increased by decreasing the time necessary to separate out an empty container of a reagent from the storage server. The method and apparatus provide for an efficient transfer of containers, while performing the loading process with precision and improving the container removal process. The need to perform container separation inventory processes in manual "batch" form is conveniently eliminated. Advantageously, the testing being performed in a reaction area is not interrupted by the reagent transfer and load method and apparatus provided herein.

Moreover, the opening of a reagent container is improved by providing a continuous process for placement, opening, and removal of depleted reagent volumes. Availability of sufficient reagent for prescribed testing greatly reduces wait time and increases testing throughput.

In conventional systems, in which manual loading and unloading of reagent containers is performed, the storage area is constantly being opened and closed, indexing operations are repeatedly stopped and restarted, and the loading process needs to be repeated whenever reagent volumes need to be replenished. Thus, the constant manual filling and emptying of the storage area wastes time and compromises cooling effects, resulting in time and condition inefficiency. However, according to the method and apparatus described herein, these disadvantages are alleviated by stabilizing and optimizing the climate of the storage area by reducing cooling loss. Thus, the percent yield of a desired reagent is increased by minimizing reagent loss and/or evaporation of a reagent due to temperature changes and fluctuations.

An additional benefit to the transfer and opening method and apparatus provided herein is the reduction in the amount of operator scanning errors.

Yet another benefit is the increase in the amount of reagent life by making a reagent available but by keeping the reagent container unopened until needed for a test waiting to be processed.

An additional benefit is that an effective method of collecting inventory information is achieved by scanning the entire contents of the reagent server ring with a barcode scanner and recording the current inventory of on-board reagent pack formulations.

Figure 21:
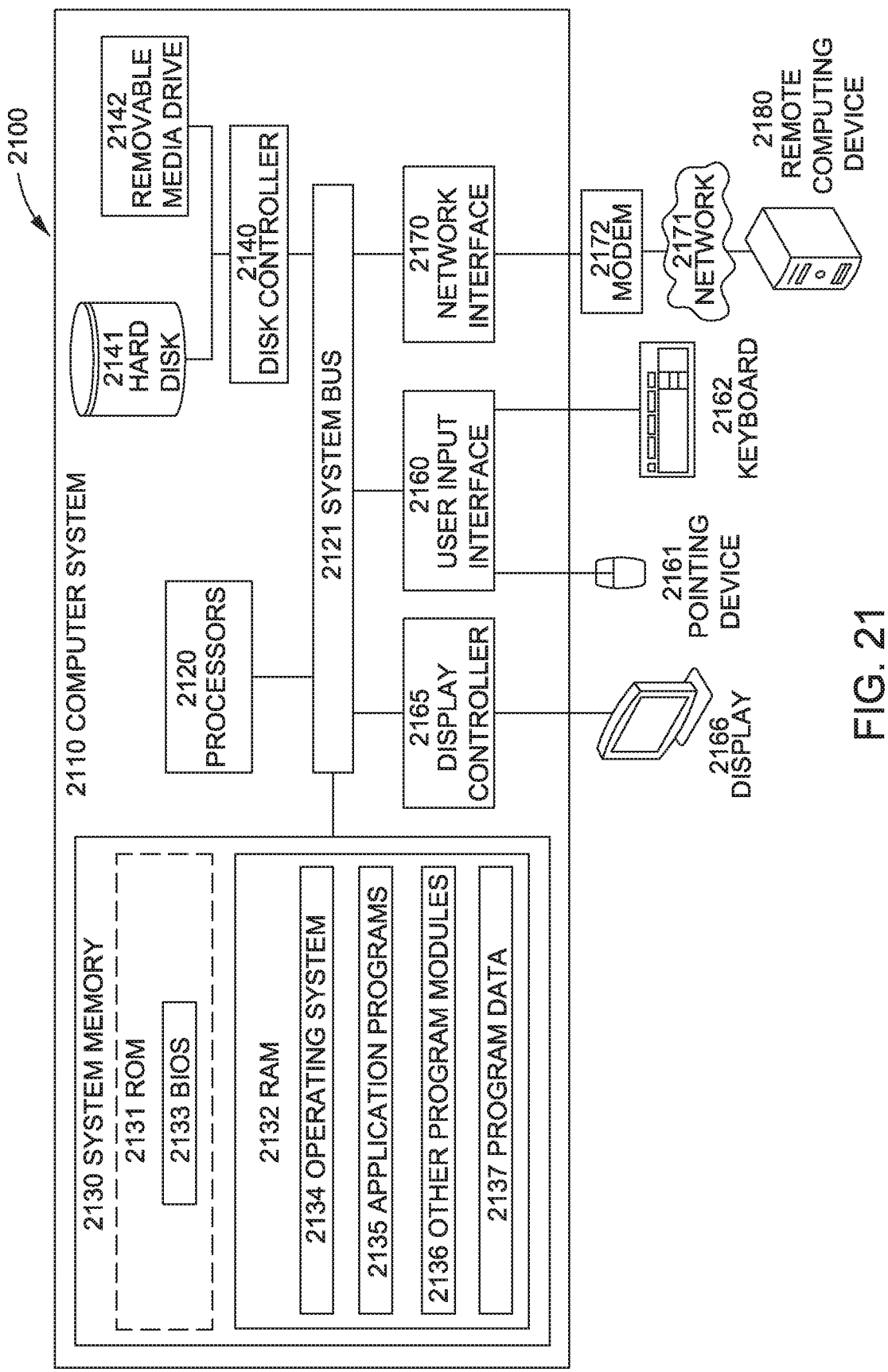
FIG. 21 illustrates an exemplary computing environment within which embodiments of the invention may be implemented.

FIG. 21 illustrates an exemplary computing environment 2100 within which embodiments of the invention may be implemented. Computing environment 2100 may include computer system 2110, which is one example of a general purpose computing system upon which embodiments of the invention may be implemented. Computers and computing environments, such as computer 2110 and computing environment 2100, are known to those of skill in the art and thus are described briefly here.

As shown in FIG. 21, the computer system 2110 may include a communication mechanism such as a bus 2121 or other communication mechanism for communicating information within the computer system 2110. The system 2110 further includes one or more processors 2120 (such as the controller described above, configured to control operation of the various components, including the motors, the barcode scanner, and the rings) coupled with the bus 2121 for processing the information. The processors 2120 may include one or more central processing units (CPUs), graphical processing units (GPUs), or any other processor known in the art.

The computer system 2110 also includes a system memory 2130 coupled to the bus 2121 for storing information and instructions to be executed by processors 2120. The system memory 2130 may include computer readable storage media in the form of volatile and/or nonvolatile memory, such as read only memory (ROM) 2131 and/or random access memory (RAM) 2132. The system memory RAM 2132 may include other dynamic storage device(s) (e.g., dynamic RAM, static RAM, and synchronous DRAM). The system memory ROM 2131 may include other static storage device(s) (e.g., programmable ROM, erasable PROM, and electrically erasable PROM). In addition, the system memory 2130 may be used for storing temporary variables or other intermediate information during the execution of instructions by the processors 2120. A basic input/output system (BIOS) 2133 containing the basic routines that help to transfer information between elements within computer system 2110, such as during start-up, may be stored in ROM 2131. RAM 2132 may contain data and/or program modules that are immediately accessible to and/or presently being operated on by the processors 2120. System memory 2130 may additionally include, for example, operating system 2134, application programs 2135, other program modules 2136, and program data 2137.

The computer system 2110 also includes a disk controller 2140 coupled to the bus 2121 to control one or more storage devices for storing information and instructions, such as a magnetic hard disk 2141 and a removable media drive 2142 (e.g., floppy disk drive, compact disc drive, tape drive, and/or solid state drive). The storage devices may be added to the computer system 2110 using an appropriate device interface (e.g., a small computer system interface (SCSI), integrated device electronics (IDE), Universal Serial Bus (USB), or FireWire).

The computer system 2110 may also include a display controller 2165 coupled to the bus 2121 to control a display or monitor 2166, such as a cathode ray tube (CRT) or liquid crystal display (LCD), for displaying information to a computer user. The computer system 2110 includes an input interface 2160 and one or more input devices, such as a keyboard 2162 and a pointing device 2161, for interacting with a computer user and providing information to the processors 2120. The pointing device 2161, for example, may be a mouse, a trackball, or a pointing stick for communicating direction information and command selections to the processors 2120 and for controlling cursor movement on the display 2166. The display 2166 may provide a touch screen interface which allows input to supplement or replace the communication of direction information and command selections by the pointing device 2161.

The computer system 2110 may perform a portion or all of the processing steps of embodiments of the invention in response to the processors 2120 executing one or more sequences of one or more instructions contained in a memory, such as the system memory 2130. Such instructions may be read into the system memory 2130 from another computer readable medium, such as a hard disk 2141 or a removable media drive 2142. The hard disk 2141 may contain one or more data-stores and data files used by embodiments of the present invention. Data-store contents and data files may be encrypted to improve security. The processors 2120 may also be employed in a multi-processing arrangement to execute the one or more sequences of instructions contained in system memory 2130. In alternative embodiments, hard-wired circuitry may be used in place of or in combination with software instructions. Thus, embodiments are not limited to any specific combination of hardware circuitry and software.

As stated above, the computer system 2110 may include at least one computer readable medium or memory for holding instructions programmed according embodiments of the invention and for containing data structures, tables, records, or other data described herein. The term "computer readable medium" as used herein refers to any medium that participates in providing instructions to the processors 2120 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 2141 or removable media drive 2142. Non-limiting examples of volatile media include dynamic memory, such as system memory 2130. Non-limiting examples of transmission media include coaxial cables, copper wire, and fiber optics, including the wires that make up the bus 2121. Transmission media may also take the form of acoustic or light waves, such as those generated during radio wave and infrared data communications.

The computing environment 2100 may further include the computer system 2110 operating in a networked environment using logical connections to one or more remote computers, such as remote computer 2180. Remote computer 2180 may be a personal computer (laptop or desktop), a mobile device, a server, a router, a network PC, a peer device or other common network node, and typically includes many or all of the elements described above relative to computer system 2110. When used in a networking environment, computer system 2110 may include modem 2172 for establishing communications over a network 2171, such as the Internet. Modem 2172 may be connected to system bus 2121 via user network interface 2170, or via another appropriate mechanism.

Network 2171 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 2110 and other computers (e.g., remote computing system 2180). The network 2171 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 2171.

As described herein, the various systems, subsystems, agents, managers and processes can be implemented using hardware components, software components and/or combinations thereof.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A reagent transfer arm apparatus in a clinical analyzer in an in vitro diagnostics (IVD) environment having a container with an opening covered by a seal, the reagent transfer arm apparatus comprising:
 a gripper assembly comprising:
  a pair of gripper fingers oriented vertically compared to a horizontal plane and opposite one another, the pair of gripper fingers configured to move between a release position in which the pair of gripper fingers are spread apart with respect to one another and a grip position in which the pair of gripper fingers are pushed together with respect to one another, wherein each of the pair of gripper fingers comprises a distal end configured to be in a shape of a point and form a shape of a single point configured to puncture the seal covering the opening of the container when the pair of gripper fingers are in the grip position, wherein the pair of gripper fingers are configured to selectively:
 grasp a portion of the container, or
 in the grip position, travel through the opening of the container and partially release from the grip position to spread apart the seal of the container;
 a gripper actuator comprising a gripper motor coupled to and configured to control horizontal, gripping movement of the pair of gripper fingers to move the pair of gripper fingers between the release position and the grip position;
 a vertically-extending frame to which the pair of gripper fingers and the gripper actuator are moveably coupled and along which the pair of gripper fingers and the gripper actuator move in a vertical direction; and a vertical drive motor configured to control vertical movement of the gripper assembly along the vertically-extending frame;

a horizontally-extending transfer arm to which the gripper assembly is moveably coupled and along which the gripper assembly moves in a horizontal direction; and a transfer arm motor configured to control horizontal movement of the gripper assembly along the horizontally-extending transfer arm;

wherein one or more controllers are configured to control operation of the gripper actuator, the gripper motor, the vertical drive motor, and the transfer arm motor to transfer the container between a load station and a storage area for access to contents of the container.

2. The apparatus of claim 1, wherein opposing surfaces of the pair of gripper fingers comprise a plurality of protrusions and a plurality of depressions, wherein the plurality of protrusions and the plurality of depressions on one of the pair of gripper fingers is configured to mate with a plurality of opposing protrusions and a plurality of opposing depressions on the other of the pair of gripper fingers.

3. The apparatus of claim 1, wherein the gripper assembly further comprises a bar code scanner configured to read a bar code label on the container, wherein the one or more controllers are further configured to identify the contents of the container based on the bar code label for transfer of the container to the storage area.

4. A reagent handling system in a clinical analyzer in an in vitro diagnostics (IVD) environment, the reagent handling system comprising:

a reagent load station comprising a tray comprising one or more tray spaces to hold one or more reagent containers, each of the one or more reagent containers configured to hold reagent and comprising a gripping portion;

a reagent transfer arm apparatus comprising:

a gripper assembly configured to grasp, one at a time, the gripping portion of each of the one or more reagent containers and move each of the one or more reagent containers to and from a respective one of the one or more tray spaces, wherein the gripper assembly comprises: (i) a pair of gripper fingers oriented vertically compared to a horizontal plane and opposite one another, the pair of gripper fingers configured to move between a release position in which the pair of gripper fingers are spread apart with respect to one another and a grip position in which the pair of gripper fingers are pushed together with respect to one another, wherein each of the pair of gripper fingers comprise a distal end configured to be in a shape of a point and form a shape of a single point configured to puncture a seal covering an opening of each of the one or more reagent containers when the pair of gripper fingers are in the grip position, wherein the pair of gripper fingers are configured to selectively (a) grasp a gripping portion of each of the one or more reagent containers or (b) in the grip position, travel through the opening of each of the one or more reagent containers and partially release from the grip position to spread apart the seal of each of the one or more reagent containers; and (ii) a gripper actuator comprising a gripper motor coupled to and configured to control horizontal, gripping movement of the pair of gripper fingers to move the pair of gripper fingers between the release position and the grip position;

a vertically-extending transfer arm to which the gripper assembly is moveably coupled and along which the gripper assembly moves in a vertical direction;

a vertical drive motor configured to control vertical movement of the gripper assembly along the vertically-extending transfer arm;

a horizontally-extending transfer arm to which the gripper assembly is moveably coupled and along which the gripper assembly moves in a horizontal direction; and a transfer arm motor configured to control horizontal movement of the gripper assembly along the horizontally-extending transfer arm;

a reagent server module comprising a storage enclosure comprising one or more indexing rings comprising indexed spaces to hold the one or more reagent containers; and one or more controllers configured to control operation of the reagent load station, the gripper assembly, the vertical drive motor, the transfer arm motor, and the one or more indexing rings to provide for transfer of the one or more reagent containers between the tray and the one or more indexing rings;

wherein the horizontally-extending transfer arm of the reagent transfer arm apparatus horizontally extends along a length of the storage enclosure;

wherein a length of the tray is oriented perpendicular to a length of the horizontally-extending transfer arm.

5. The system of claim 4, wherein the vertical movement of the pair of gripper fingers provides for insertion and removal of the one or more reagent containers into and out of the tray and the one or more indexing rings.

6. The system of claim 4, wherein the reagent load station further comprises:

a tray motor configured to move the tray in a horizontal direction between a load point and one or more transfer points, each of the one or more transfer points corresponding to a respective one of the one or more tray spaces; wherein the move by the gripper assembly of each of the one or more reagent containers is to and from a respective one of the one or more transfer points; and a loader track comprising a surface on which the tray is held and moves.

7. The system of claim 4, wherein each of the one or more reagent containers include a bar code label thereon;

wherein the gripper assembly comprises a bar code scanner configured to read the bar code label on each of the one or more reagent containers, wherein the one or more controllers are further configured to identify the contents of a particular reagent container based on a corresponding bar code label and transfer the particular reagent container to a particular indexed space on one of the one or more indexing rings.

8. The system of claim 4, wherein the reagent server module further comprises a door on an upper portion of the storage enclosure configured to move to an open position in which an interior portion of the storage enclosure is accessible and a closed position in which the interior portion of the storage enclosure is inaccessible.

9. The system of claim 8, wherein the door comprises a slide configured to be moved to the open position and the closed position by the gripper assembly.

10. The system of claim 4, further comprising a wash station accessible to the gripper assembly via the horizontal movement of the gripper assembly along the horizontally-extending transfer arm, the wash station comprising a rinse station configured to rinse the gripper assembly and a drying station configured to vacuum dry the gripper assembly.

11. A method of handling reagent containers in a clinical analyzer in an in vitro diagnostics (IVD) environment, the method comprising:
   identifying, by a controller, a need for a particular reagent to be added to a reagent server module comprising one or more indexing rings comprising one or more indexed spaces;
   moving, by transfer arm motors configured to control horizontal and vertical movement of a gripper assembly along horizontally and vertically-extending transfer arms, the gripper assembly to a reagent load station, the reagent load station comprising a tray with one or more tray spaces to hold one or more reagent containers, each of the one or more reagent containers configured to hold reagent and comprising a gripping portion, the gripper assembly configured to grasp the gripping portion of each of the one or more reagent containers, wherein the gripper assembly comprises:
   a pair of gripper fingers oriented vertically compared to a horizontal plane and opposite one another, the pair of gripper fingers configured to move between a release position in which the pair of gripper fingers are spread apart with respect to one another and a grip position in which the pair of gripper fingers are pushed together with respect to one another, wherein each of the pair of gripper fingers comprise a distal end configured to be in a shape of a point and form a shape of a single point configured to puncture a seal covering an opening of each of the one or more reagent containers when the pair of gripper fingers are in the grip position, wherein the pair of gripper fingers are configured to selectively (a) grasp a gripping portion of each of the one or more reagent containers or (b) in the grip position, travel through the opening of each of the one or more reagent containers and partially release from the grip position to spread apart the seal of each of the one or more reagent containers;
   scanning, by a barcode scanner on the gripper assembly, a barcode label on each of the one or more reagent containers in the tray until a desired barcode label is identified, the desired barcode label corresponding to the particular reagent and affixed to a desired reagent container;
   lifting, by the gripper assembly, the desired reagent container;
   moving, by the transfer arm motors, the gripper assembly with the desired reagent container to a load position of the reagent server module;
   positioning, by the gripper assembly via the load position, the desired reagent container in a particular indexed space of the one or more indexed spaces; and
   opening, by the gripper assembly, a seal of the desired reagent container;
   wherein the gripper assembly and transfer arm motor functions are controlled by the controller.

12. The method of claim 11, wherein during scanning by the barcode scanner, the tray indexes laterally along a loader track comprising a surface on which the tray is held and moves, the lateral indexing comprising moving the tray, by a tray motor controlled by the controller, so that one of the one or more tray spaces is aligned with the barcode scanner at a transfer point.

13. The method of claim 11, further comprising:
   removing, by the gripper assembly, an unneeded reagent container from the reagent server module.

14. The method of claim 11, further comprising:
   opening, by the gripper assembly, a slide-able door of the reagent server module prior to moving the gripper assembly to the reagent load station; and
   closing, by the gripper assembly, the slide-able door of the reagent server module after opening the seal of the desired reagent container;
   wherein opening and closing the slide-able door of the reagent server module comprises utilizing the pair of gripper fingers of the gripper assembly to slide the slide-able door.

15. The method of claim 11, wherein the gripper assembly further comprises: (i) a gripper actuator comprising a gripper motor coupled to and configured to control the pair of gripper fingers to move the pair of gripper fingers between the release position and the grip position; (ii) a vertically-extending frame along which the pair of gripper fingers and the gripper actuator move in a vertical direction; and (iii) a vertical drive motor configured to control vertical movement of the pair of gripper fingers and the gripper actuator along the vertically-extending frame;
   wherein the opening, by the gripper assembly, of the seal of the desired reagent container comprises:
   closing, by the gripper actuator, the pair of gripper fingers into the grip position;
   lowering, by the vertical drive motor, the pair of gripper fingers to pierce the seal of the desired reagent container; and
   opening, by the gripper actuator, the pair of gripper fingers into a partially open position to spread the seal.

16. The method of claim 11, wherein lifting, by the gripper assembly, the desired reagent container comprises:
   opening, by a gripper actuator comprising a gripper motor on the gripper assembly, the pair of gripper fingers into the release position;
   lowering, by a vertical drive motor configured to control vertical movement of the pair of gripper fingers and the gripper actuator along a vertically-extending frame along which the pair of gripper fingers and the gripper actuator move in a vertical direction, the pair of gripper fingers to the desired reagent container;
   gripping, by the pair of gripper fingers, the desired reagent container, by closing the pair of gripper fingers at the gripping portion of the desired reagent container; and
   lifting, by the vertical drive motor, the pair of gripper fingers with the desired reagent container.

17. The method of claim 11, further comprising:
   moving, by the transfer arm motors, the gripper assembly to a wash station;
   lowering, by a vertical drive motor configured to control vertical movement of the gripper assembly along a vertically-extending frame, the gripper assembly into the wash station to receive a rinse solution; and
   lifting, by the vertical drive motor, the gripper assembly out of the wash station.

* * * * *